(12) United States Patent
Prakash et al.

(10) Patent No.: US 11,027,485 B2
(45) Date of Patent: Jun. 8, 2021

(54) SHEET-BASED ADDITIVE MANUFACTURING METHODS

(71) Applicant: The Boeing Company, Chicago, IL (US)

(72) Inventors: Om Prakash, Bangalore (IN); Nishant K. Sinha, Bangalore (IN); Vijaykumar S. Ijeri, Bangalore (IN)

(73) Assignee: The Boeing Company, Chicago, IL (US)

( * ) Notice: Subject to any disclaimer, the term of this patent is extended or adjusted under 35 U.S.C. 154(b) by 620 days.

(21) Appl. No.: 15/827,781

(22) Filed: Nov. 30, 2017

(65) Prior Publication Data

US 2019/0160735 A1 May 30, 2019

(51) Int. Cl.
| | |
|---|---|
| *B29C 64/00* | (2017.01) |
| *B33Y 10/00* | (2015.01) |
| *B33Y 30/00* | (2015.01) |
| *B33Y 50/00* | (2015.01) |
| *B23K 26/00* | (2014.01) |
| *B29C 64/147* | (2017.01) |
| *B29C 64/393* | (2017.01) |
| *B29C 64/268* | (2017.01) |
| *B23K 26/21* | (2014.01) |
| *B23K 26/364* | (2014.01) |
| *B33Y 50/02* | (2015.01) |

(Continued)

(52) U.S. Cl.
CPC ............ *B29C 64/147* (2017.08); *B23K 26/21* (2015.10); *B23K 26/364* (2015.10); *B29C 64/268* (2017.08); *B29C 64/282* (2017.08); *B29C 64/393* (2017.08); *B33Y 10/00* (2014.12); *B33Y 30/00* (2014.12); *B33Y 50/02* (2014.12); *B29K 2101/12* (2013.01); *B29K 2105/256* (2013.01); *B29K 2995/0026* (2013.01)

(58) Field of Classification Search
None
See application file for complete search history.

(56) References Cited

U.S. PATENT DOCUMENTS

| | | |
|---|---|---|
| 5,206,496 A | 4/1993 | Clement et al. |
| 7,704,586 B2 | 4/2010 | Schubel et al. |

(Continued)

FOREIGN PATENT DOCUMENTS

| | | |
|---|---|---|
| WO | 9003893 | 4/1990 |

OTHER PUBLICATIONS

Extended European Search Report concerning EP Application No. 18207871.7 dated Apr. 8, 2019.

(Continued)

*Primary Examiner* — Jacob T Minskey
*Assistant Examiner* — Matthew Hoover
(74) *Attorney, Agent, or Firm* — Kunzler Bean & Adamson

(57) ABSTRACT

A method of fabricating a part includes stacking sheets of fusible material to form a stack. The method also includes directing a laser beam through at least one sheet of the stack. The method also includes transferring energy from the laser beam to multiple locations on at least one interface between adjacent sheets of the stack, according to a predetermined pattern corresponding with a design of the part, to form corresponding multiple molten regions. The molten regions are conjoined together to form a fused portion of the adjacent sheets. The fused portion of the adjacent sheets defines the part.

22 Claims, 14 Drawing Sheets

(51) Int. Cl.
*B29C 64/282* (2017.01)
*B29K 101/12* (2006.01)
*B29K 105/00* (2006.01)

(56) References Cited

U.S. PATENT DOCUMENTS

| | | | |
|---|---|---|---|
| 8,314,359 B2* | 11/2012 | Bovatsek | B29C 65/14 |
| | | | 219/121.64 |
| 9,550,349 B1 | 1/2017 | Larsen et al. | |
| 2004/0224173 A1 | 11/2004 | Boyd et al. | |
| 2010/0040836 A1 | 2/2010 | Li et al. | |
| 2011/0200802 A1 | 8/2011 | Li et al. | |
| 2011/0210459 A1* | 9/2011 | Bille | A61B 5/0075 |
| | | | 264/1.37 |
| 2015/0321417 A1 | 11/2015 | Mironets | |
| 2016/0356974 A1* | 12/2016 | Bringuier | B23K 26/21 |
| 2017/0144370 A1 | 5/2017 | Moore et al. | |
| 2018/0001418 A1* | 1/2018 | Evans | B23K 26/127 |

OTHER PUBLICATIONS

Marchant, A. L., Experimental and theoretical studies of surface and volume changes in dielectrics induced by long-pulse RF CO2 laser irradiation, thesis submitted for degree of Doctor of Philosophy, Mar. 2012, pp. 1-195.

LPKF Laser Plastic Welding, http://www.lpkfusa.com/products/laser_plastic_welding/ accessed Nov. 30, 2017.

* cited by examiner

SHEET-BASED ADDITIVE MANUFACTURING METHODS

FIELD

This disclosure relates generally to additive manufacturing, and more particularly to additive manufacturing using sheets as the additive material.

BACKGROUND

Conventional additive manufacturing techniques produce parts using powder or wire-fed materials. However, producing parts in a time, cost, and energy efficient manner using conventional additive manufacturing techniques can be difficult. Furthermore, parts produced by conventional additive manufacturing techniques have poor surface finishes and often require the use of support structures, particularly for parts having complex geometries.

SUMMARY

The subject matter of the present application has been developed in response to the present state of the art, and in particular, in response to the shortcomings of additive manufacturing, that have not yet been fully solved by currently available techniques. Accordingly, the subject matter of the present application has been developed to provide a sheet-based additive manufacturing method and system that overcome at least some of the above-discussed shortcomings of prior art techniques.

Described herein is a method of fabricating a part. The method comprises stacking sheets of fusible material to form a stack. The method also comprises directing a laser beam through at least one sheet of the stack. The method further comprises transferring energy from the laser beam to multiple locations on at least one interface between adjacent sheets of the stack, according to a predetermined pattern corresponding with a design of the part, to form corresponding multiple molten regions, conjoined together to form a fused portion of the adjacent sheets. The fused portion of the adjacent sheets defines the part. The preceding subject matter of this paragraph characterizes example 1 of the present disclosure.

The method further comprises scoring the adjacent sheets of the stack at a boundary between the fused portion of the adjacent sheets and at least one unfused portion of the adjacent sheets. The method also comprises removing the at least one unfused portion of the adjacent sheets from the fused portion of the adjacent sheets. The preceding subject matter of this paragraph characterizes example 2 of the present disclosure, wherein example 2 also includes the subject matter according to example 1, above.

The fused portion of the adjacent sheets is homogenous and forms a one-piece monolithic construction. The preceding subject matter of this paragraph characterizes example 3 of the present disclosure, wherein example 3 also includes the subject matter according to any one of examples 1-2, above.

The fusible material comprises a thermoplastic material. The preceding subject matter of this paragraph characterizes example 4 of the present disclosure, wherein example 4 also includes the subject matter according to any one of examples 1-3, above.

The thermoplastic material is optically transparent for at least one radiation wavelength. The preceding subject matter of this paragraph characterizes example 5 of the present disclosure, wherein example 5 also includes the subject matter according to example 4, above.

Transferring energy from the laser beam to multiple locations comprises focusing the laser beam at the multiple locations. The preceding subject matter of this paragraph characterizes example 6 of the present disclosure, wherein example 6 also includes the subject matter according to any one of examples 1-5, above.

The laser beam is focused at multiple locations on a first interface between a first sheet of the sheets of the stack and a second sheet of the sheets of the stack. The laser beam is focused at multiple locations on a second interface between the second sheet of the sheets of the stack and a third sheet of the sheets of the stack. The second sheet is interposed between the first sheet and the third sheet. The preceding subject matter of this paragraph characterizes example 7 of the present disclosure, wherein example 7 also includes the subject matter according to example 6, above.

Stacking the sheets of fusible material to form the stack comprises, after the laser beam is focused at the multiple locations on the first interface between the first sheet of the sheets of the stack and the second sheet of the sheets of the stack and before the laser beam is focused at the multiple locations on the second interface between the second sheet of the sheets of the stack and the third sheet of the sheets of the stack, automatically feeding the third sheet onto the second sheet of the sheets of the stack using an actuator. The preceding subject matter of this paragraph characterizes example 8 of the present disclosure, wherein example 8 also includes the subject matter according to example 7, above.

A configuration of the multiple locations on the first interface is different than a configuration of the multiple locations on the second interface. The preceding subject matter of this paragraph characterizes example 9 of the present disclosure, wherein example 9 also includes the subject matter according to any one of examples 7-8, above.

Focusing the laser beam at the multiple locations on at least one interface between adjacent sheets of the stack comprises at least one of moving the stack relative to the laser beam or adjusting a focus of the laser beam. The preceding subject matter of this paragraph characterizes example 10 of the present disclosure, wherein example 10 also includes the subject matter according to any one of examples 6-9, above.

The method of fabricating a part further comprises supplying additional energy to the stack while directing the laser beam through the at least one sheet of the stack and transferring energy from the laser beam to the multiple locations on the at least one interface between the adjacent sheets of the stack. The preceding subject matter of this paragraph characterizes example 11 of the present disclosure, wherein example 1 also includes the subject matter according to any one of examples 1-10, above.

The additional energy comprises at least one of thermal energy or ultrasonic energy. The preceding subject matter of this paragraph characterizes example 12 of the present disclosure, wherein example 12 also includes the subject matter according to example 11, above.

The method of fabricating a part further comprises positioning a sheet of metallic material between the adjacent sheets. The sheet of metallic material comprises apertures each corresponding with a respective location of the multiple locations. The preceding subject matter of this paragraph characterizes example 13 of the present disclosure, wherein example 13 also includes the subject matter according to any one of examples 1-12, above.

One of the sheets of the stack has a thickness different than that of another one of the sheets of the stack. The preceding subject matter of this paragraph characterizes example 14 of the present disclosure, wherein example 14 also includes the subject matter according to any one of examples 1-13, above.

The fused portion has a three-dimensional compound shape. The preceding subject matter of this paragraph characterizes example 15 of the present disclosure, wherein example 15 also includes the subject matter according to any one of examples 1-14, above.

The method of fabricating a part further comprises, while directing the laser beam through at least one sheet of the stack and transferring energy from the laser beam to multiple locations on at least one interface between adjacent sheets of the stack, directing a second laser beam through at least one sheet of the stack and transferring energy from the second laser beam to multiple locations on at least one interface between adjacent sheets of the stack, according to a predetermined pattern corresponding with a design of a second part, to form corresponding multiple molten regions, conjoined together to form a second fused portion of the adjacent sheets. The second fused portion of the adjacent sheets defines the second part. The preceding subject matter of this paragraph characterizes example 16 of the present disclosure, wherein example 16 also includes the subject matter according to any one of examples 1-15, above.

Stacking the sheets of fusible material comprises wrapping a continuous sheet of fusible material about itself and a central core. The preceding subject matter of this paragraph characterizes example 17 of the present disclosure, wherein example 17 also includes the subject matter according to any one of examples 1-16, above.

The laser beam is a first laser beam. The fused portion is a first fused portion. The part is a first part. The method further comprises directing a second laser beam through at least one sheet of the stack. The method also comprises focusing the second laser beam at multiple locations on at least one interface between adjacent sheets of the stack, according to the predetermined pattern corresponding with the design of the part, to form corresponding multiple molten regions, conjoined together to form a second fused portion of the adjacent sheets. The second fused portion of the adjacent sheets defines a second part. The first laser beam and the second laser beam are directed through the at least one sheet of the stack in a direction transverse to the central core. The preceding subject matter of this paragraph characterizes example 18 of the present disclosure, wherein example 18 also includes the subject matter according to example 17, above.

Stacking sheets of fusible material comprises stacking a second sheet of semi-transparent fusible material onto a first sheet of transparent fusible material and stacking a third sheet of transparent fusible material onto the second sheet of semi-transparent fusible material, such that the second sheet is interposed between the first sheet and the third sheet, to form the stack. Directing the laser beam further comprises directing a laser beam through the third sheet of the stack and into the second sheet of the stack at multiple locations of the second sheet. Transferring energy from the laser beam further comprises absorbing energy from the laser beam at the multiple locations of the second sheet to form corresponding multiple molten regions, conjoined together, in the first sheet, the second sheet, and the third sheet to form the fused portion of the first sheet, the second sheet, and the third sheet. The fused portion of the first sheet, the second sheet, and the third sheet defines the part. The preceding subject matter of this paragraph characterizes example 19 of the present disclosure, wherein example 19 also includes the subject matter according to any one of examples 1-18, above.

The second sheet comprises a dye configured to absorb two photons of a first energy from a laser beam pulsed at a first rate and not absorb single photons of a second energy from a laser beam pulsed at a second rate. The first rate is higher than the second rate. The first energy is lower than the second energy. The laser beam is pulsed at the first rate and has photons of the first energy. The preceding subject matter of this paragraph characterizes example 20 of the present disclosure, wherein example 20 also includes the subject matter according to example 19, above.

The method further comprises, after directing the laser beam through the third sheet of the stack and into the second sheet of the stack at multiple locations of the second sheet and absorbing energy from the laser beam at the multiple locations of the second sheet, stacking a fourth sheet of the semi-transparent fusible material onto the third sheet and stacking a fifth sheet of the transparent fusible material onto the fourth sheet, such that the fourth sheet is interposed between the third sheet and the fifth sheet, to further form the stack. The method also comprises directing a laser beam through the fifth sheet of the stack and into the fourth sheet of the stack at multiple locations of the fourth sheet. The method additionally comprises absorbing energy from the laser beam at the multiple locations of the fourth sheet to form corresponding multiple molten regions, conjoined together, in the third sheet, the fourth sheet, and the fifth sheet to form a fused portion of the third sheet, the fourth sheet, and the fifth sheet. The fused portion of the third sheet, the fourth sheet, and the fifth sheet further defines the part. The preceding subject matter of this paragraph characterizes example 21 of the present disclosure, wherein example 21 also includes the subject matter according to any one of examples 19-20, above.

Further described herein is a system that comprises a base, configured to support a stack of sheets of fusible material. The system also comprises a first formation laser, configured to generate a first laser beam. The system additionally comprises optics, configured to receive the first laser beam and direct the first laser beam through at least one sheet of the stack of sheets. The system further comprises a first separation laser, configured to generate a second laser beam. The system also comprises an actuation system, configured to move the base relative to the optics, move the second laser beam relative to the base, and feed at least one sheet of fusible material onto the stack of sheets. The system additionally comprises a controller, operably coupled with the first formation laser, the second formation laser, and the actuation system. The controller is configured to control the first formation laser and the actuation system to direct the first laser beam at multiple locations between sheets of the stack, according to a predetermined pattern corresponding with a design of the part, to form corresponding multiple molten regions, conjoined together to form a fused portion of the sheets, wherein the fused portion of the sheets defines the part. The controller is also configured to control the first separation laser and the actuation system to move the second laser beam relative to the base to score the sheets of the stack at a boundary between the fused portion of the sheets and at least one unfused portion of the sheets. The preceding subject matter of this paragraph characterizes example 22 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Described herein are embodiments of a method and a system for fabricating a part in an additive manufacturing manner. For example, embodiments described herein utilize sheets of fusible material that are sequentially added to a stack and fused together with energy from a laser beam. By using stacks of sheets of fusible material, instead of powder and wire-fed materials, time, cost, and energy efficiency is improved compared to conventional additive manufacturing techniques. Additionally, conjoining stacks of sheets of fusible materials helps to improve the surface finish of the finished part in specific directions and reduces the need for complex geometry support structures compared to traditional additive manufacturing techniques.

Figure 1:
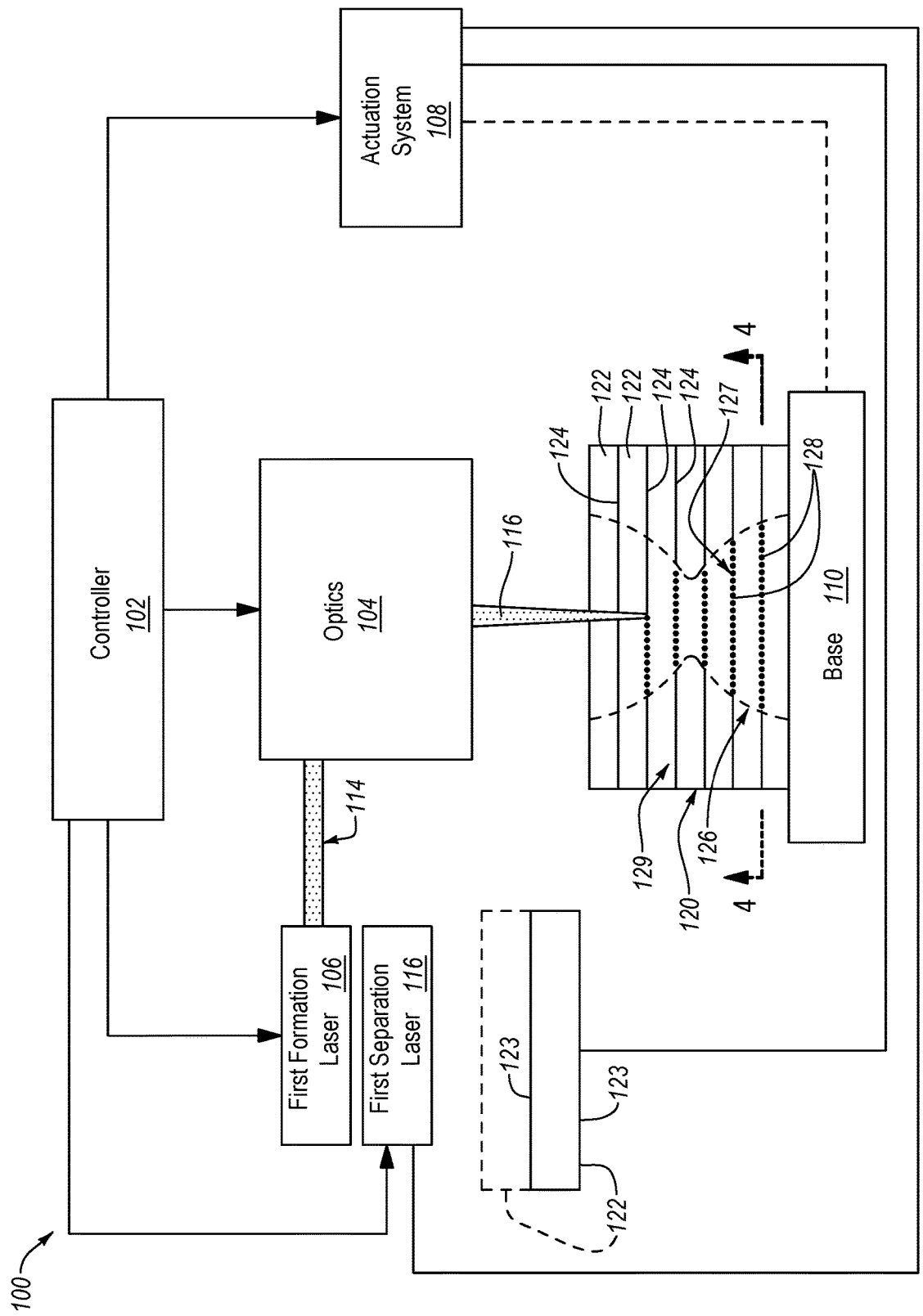
FIG. 1 is a schematic diagram of a system for fabricating a part, with the system executing a fused portion formation step of a method of fabricating a part, according to one or more examples of the present disclosure.

Referring to FIG. 1, according to one embodiment, a system 100 for fabricating a part 130 (see, e.g., FIG. 2) includes a controller 102, optics 104, a first formation laser 106, an actuation system 108, and a base 110. The controller 102 is operably coupled with the optics 104, the first formation laser 106, and the actuation system 108.

The controller 102 communicates with and/or receives communication from various components of the system 100, including the optics 104, the first formation laser 106, and the actuation system 108, and other possible components, such as a first separation laser 112. Generally, the controller 102 controls the operation of the system 100. The controller 102 is depicted in FIG. 1 as a single physical unit, but can include two or more physically separated units or components in some embodiments if desired. Furthermore, the controller 102 processes inputs using various algorithms, stored data, and other inputs to generate outputs, such as commands, to control operation of the system 100.

The controller 102 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. The semiconductor integrated circuit device or other hardware appliance of the controller 102, in certain embodiments, includes and/or is communicatively coupled to one or more volatile or non-volatile memory media. Embodiments of the controller 102 may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the controller 102 may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The controller 102 may also be implemented in code and/or software for execution by various types of processors. For instance, the controller 102 may comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the controller and achieve the stated purpose for the controller 102.

The first formation laser 106 is configured to generate a first laser beam 114. Accordingly, the first formation laser 106 can be any of various types of lasers operable to generate any of various types of laser beams. For example, the first formation laser 106 can be a gas laser (such as a CO2 laser), chemical laser, dye laser, metal-vapor laser, semiconductor laser, and the like. The first laser beam 114 can be defined as one or more laser beam pulses or output pulses. Each laser beam pulse of the first laser beam 114 is characterized by, among other properties, a given waveform shape (e.g., power per unit time P(t) profile), which may be described by an equivalent duration, and, by integrating the P(t) profile over time, a pulse energy E. Accordingly each individual laser beam pulse of the first laser beam 114 has an individual P(t) profile and energy E. The first laser beam 114 is capable of generating multiple, successive laser beam pulses at a given frequency (e.g., repetition rate). In one implementation, the first formation laser 106 is operable in a single-photon mode (with pulsed beam at a relatively slower or longer pulse rate and shorter wavelength) and a two-photon mode (with pulsed beam at a relatively fast (e.g., ultrafast) or shorter pulse rate and longer wavelength).

The optics 104 are configured to receive the first laser beam 114 from the first formation laser 106, to direct the first laser beam 114 through at least one sheet 122 of a stack 120, which includes at least two sheets 122, and to focus the first laser beam 114 at an interface 124 between two adjacent sheets 122 of the stack 120. The optics 104 includes one or more laser beam adjustment devices. Each one of the laser beam adjustment devices adjusts one or more of a direction of the laser beam 114, a focus (e.g., diverging or converging) of the first laser beam 114, or any of various other characteristics of the laser beam. Generally, in one implementation, the optics 104 ensure the first laser beam 114 is parallel to the thicknesses of the sheets 122 (i.e., perpendicular to the broad surface) of the stack 120 when the laser beam 114 enters the stack 120 and focused at a predetermined location on an interface 124 between two adjacent sheets 122 of the stack. However, in other implementations, the optics 104 may direct the first laser beam 114 into the stack 120 at an angle other than 90-degrees relative to the broad face of the stack 120.

Figure 5:
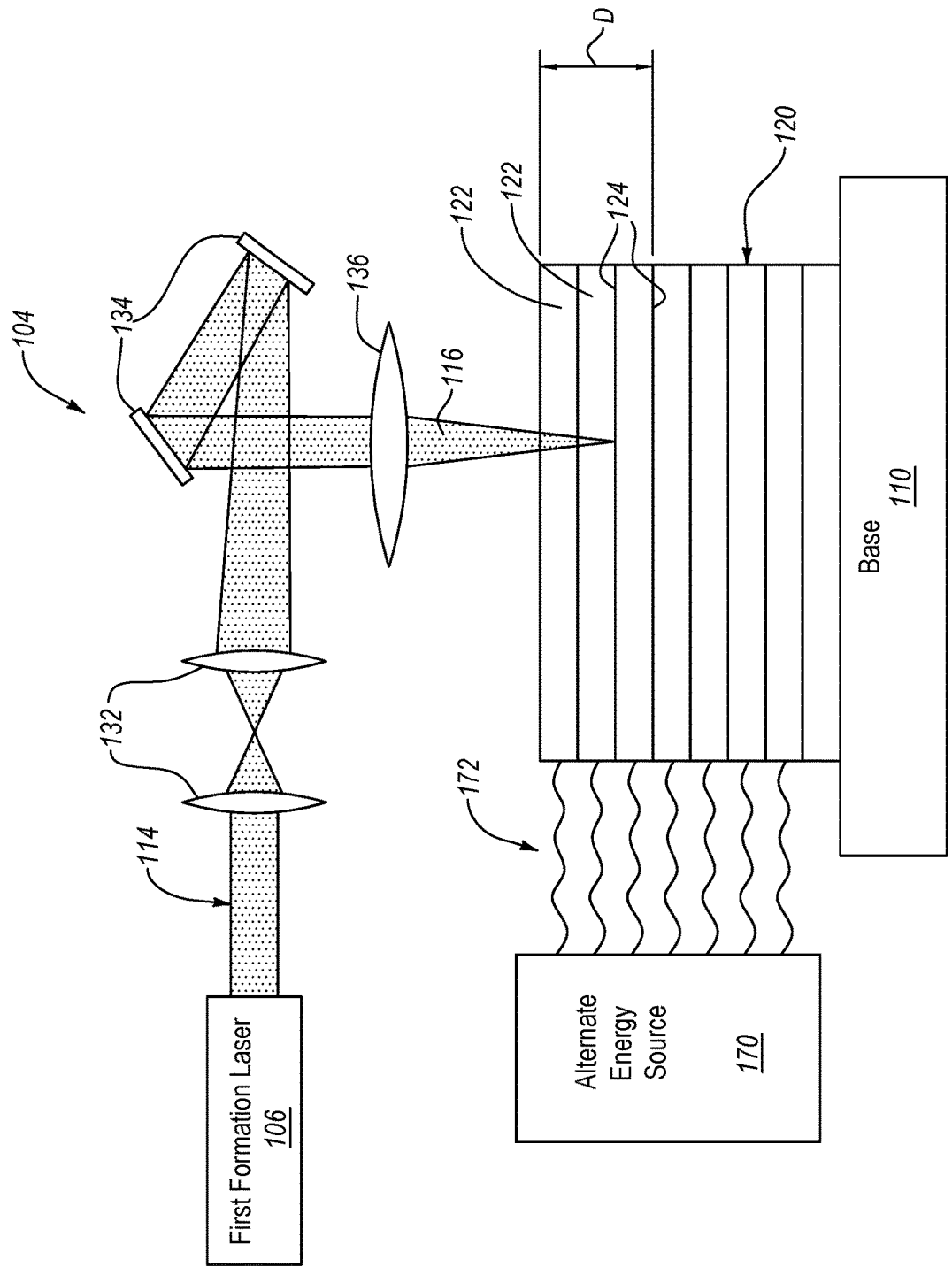
FIG. 5 is a schematic diagram of a portion of a system for fabricating a part, according to one or more examples of the present disclosure.
Figure 6:
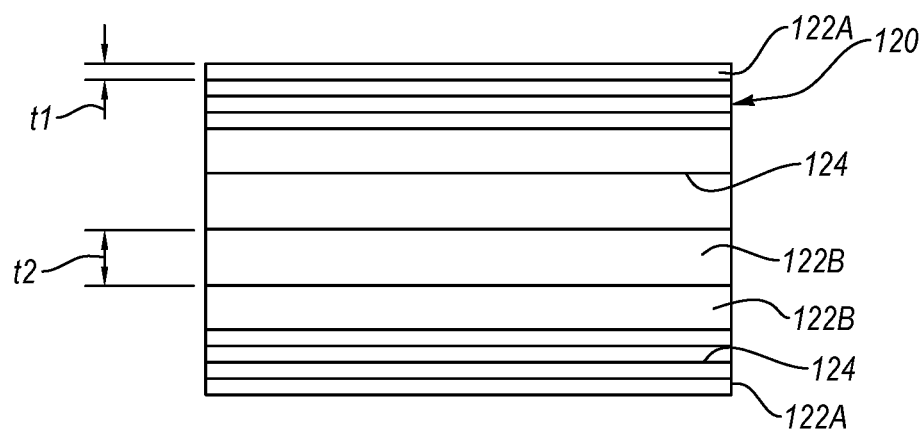
FIG. 6 is a side elevation view of a stack of sheets of fusible material, according to one or more examples of the present disclosure.

Referring to FIG. 5, in one particular implementation, for example, the optics 104 include dual lenses 132 configured to invert and widen the first laser beam 114. The optics 104 may further include dual mirrors 134 that receive the first laser beam 114 from the dual lenses 132 and redirect the laser beam 114 toward the stack 120. In one implementation, the dual mirrors 134 redirect the laser beam 114 approximately 90-degrees such that the laser beam 114 is parallel to the thicknesses of the sheets 122 of the stack 120. However, in other implementations, the dual mirrors 134 redirect the first laser beam 114 at angles other than 90-degrees. In some implementations, the first formation laser 106 is oriented to direct the first laser beam 114 into the stack 120 at a proper angle such that the optics 104 do not include the dual mirrors 134. The optics 104 may also include at least one converging lens 136, which is configured to receive the first laser beam 114, from the dual mirrors 134 for example, and converge the laser beam 114, into a focused portion 116 of the first laser beam 114, to a point at a desired location. In other words, the converging lens 136 is operable to focus the first laser beam 114 to a point at a desired location. Focusing the first laser beam 114 at a point also focuses or concentrates the combined energy of the first laser beam 114 at the point. Accordingly, the energy at the focal point is much greater than at any point of the first laser beam 114 prior to the first laser beam 114 being focused at the focal point.

The base 110 is configured to support the stack 120 while one or more part are fabricated from the stack 120. Accordingly, the base 110 can include any of various support structures that help to reliably and sturdily support a stack of sheets of fusible material while the stack is processed. In one implementation, the base 110 includes a plate with a flat support surface on which the stack 120 is positioned. The base 110 can include other features that help secure the stack 120 on the plate, such as clamps, ties, brackets, straps, and the like. Alternatively, or additionally, the base 110 may include a recess that receives the stack 120 and is shaped to complement the shape of the stack 120.

The actuation system 108 is configured to actuate one or more of the features of the system 100. Accordingly, the actuation system 108 includes any of various mechanical, electromagnetic, electro-mechanical component, and/or other types of components or combination of components configured to actuate one or more of the actuatable features of the system 100. In the illustrated embodiment, the actuation system 108 is configured to move the base 110 relative to the optics 104. The base 110 and the optics 104 can move relative to each other by either keeping the base 110 stationary and moving the optics 104, keeping the optics 104 stationary and moving the base 110, or both moving the base 110 and moving the optics 104. Accordingly, the actuation system 108 can be physically coupled to the base 110, to one or more of the components of the optics 104, or to both the base 110 and one or more of the components of the optics 104. In one implementation, for example, the actuation system 108 includes an actuator (e.g., electric motor, linear actuator, worm drive, etc.) coupled to the base 110 and actuatable to move the base 110 two-dimensionally or three-dimensionally relative to the optics 104. According to the same, or another implementation, the actuation system 108 includes an actuator (e.g., electric motor, linear actuator, worm drive, etc.) coupled to the converging lens 136 of the optics 104 and actuatable to move the converging lens 136 two-dimensionally or three-dimensionally relative to the base 110.

Figure 2:
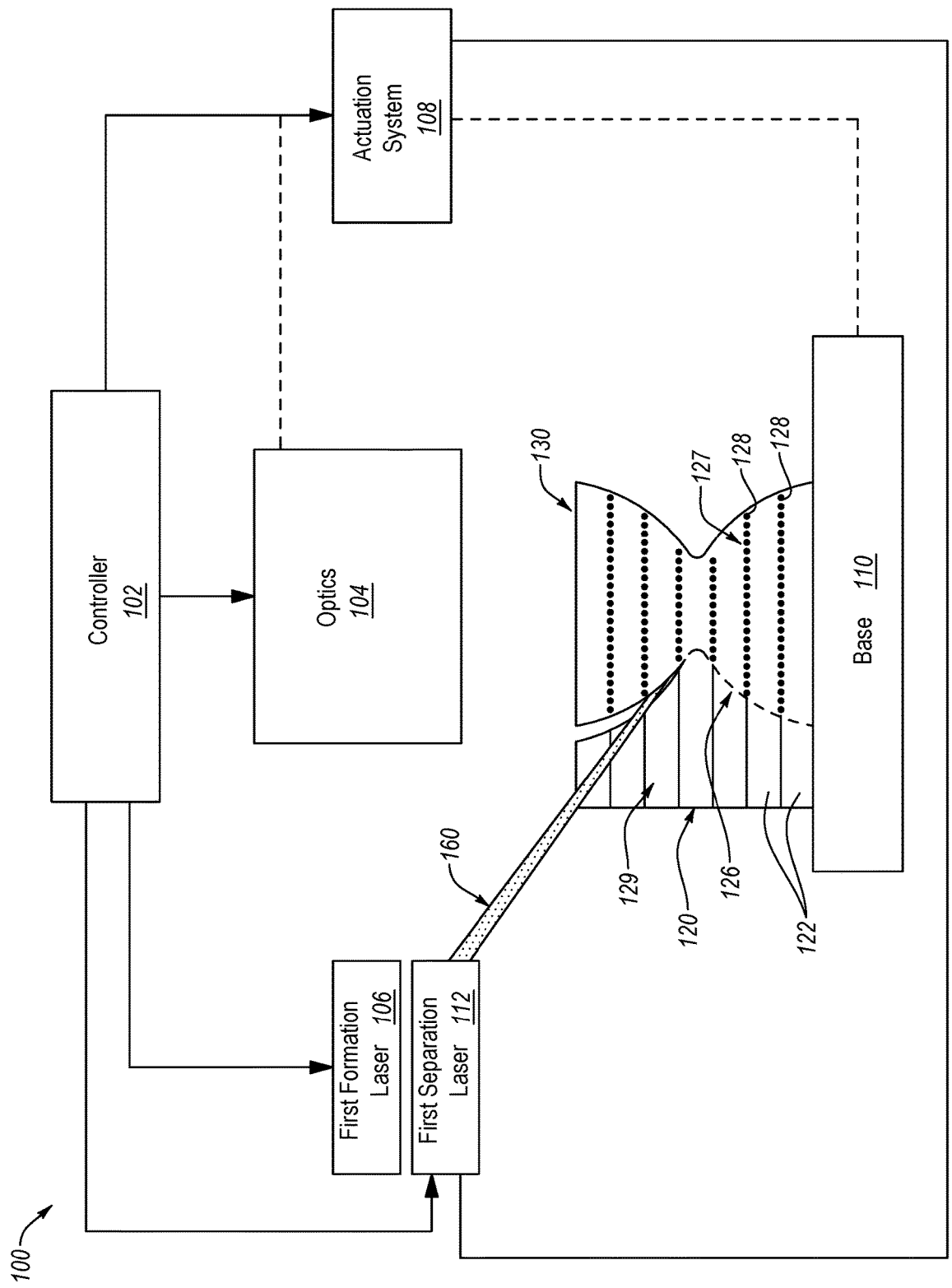
FIG. 2 is a schematic diagram of the system for fabricating a part of FIG. 1, with the system executing a score and removal step of a method of fabricating a part, according to one or more examples of the present disclosure

Referring to FIGS. 1 and 2, the system 100 also includes a first separation laser 112 configured to generate a second laser beam 160. Accordingly, the first separation laser 112 can be any of various types of lasers operable to generate any of various types of laser beams. For example, the first separation laser 112 can be a gas laser, chemical laser, dye laser, metal-vapor laser, semiconductor laser, and the like. The second laser beam 160 can be defined as one or more laser beam pulses or output pulses. In one implementation, although shown as separate, the first formation laser 106 and the first separation laser 112 can be the same laser. In other words, a single laser can be used to generate the first laser beam 114 and the second laser beam 160. The actuation system 108 can be physically coupled to the first separation laser 112 and configured to move the first separation laser 112 relative to the base 110. Alternatively, the optics 104 may receive the first separation laser 112 and redirect the first separation laser 112 towards the base 110 when actuated by the actuation system 108. The controller 102 is operably coupled with the first separation laser 112.

The actuation system 108 further includes a feed mechanism, such as a robotic arm, conveyor, and/or the like, configured to feed one or more sheets 122 onto the stack 120 after the stack 120 is on the base 110. In some implementations, the feed mechanism of the actuation system 108 is used to first position a stack 120 on the base 110 and subsequently position one sheet at a time, or multiple sheets at a time, onto the previously positioned stack 120.

In operation, the system 100 positions a stack 120 of sheets 122 of fusible material onto the base 110 such that the stack 120 is between the base 110 and the optics 104. More specifically, for example, the controller 102 controls the feed mechanism of the actuation system 108 to place at least two sheets 122 of fusible material onto the base 110 to form the stack 120.

Figure 3:
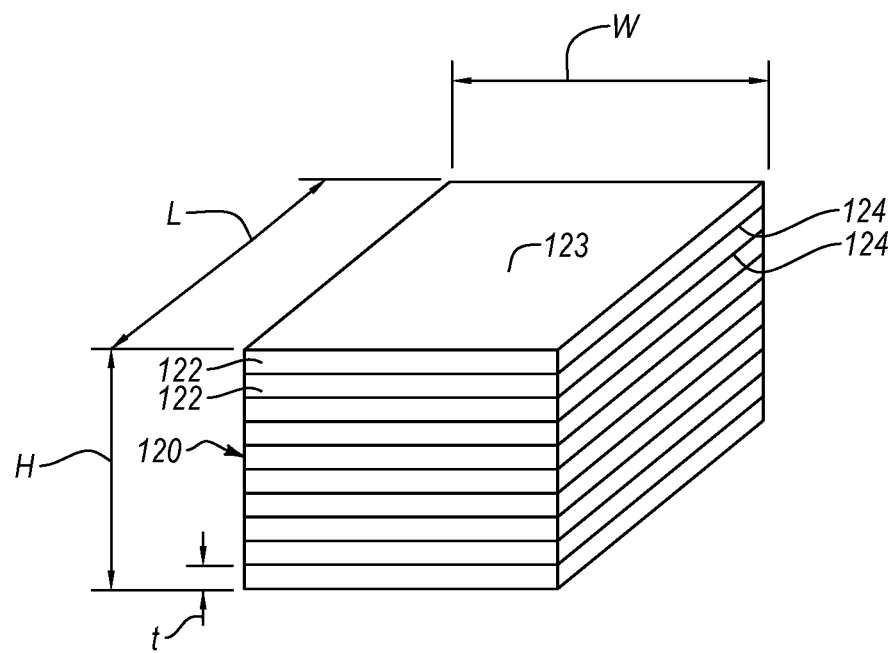
FIG. 3 is a perspective view of a stack of sheets of fusible material, according to one or more examples of the present disclosure.
Figure 7:
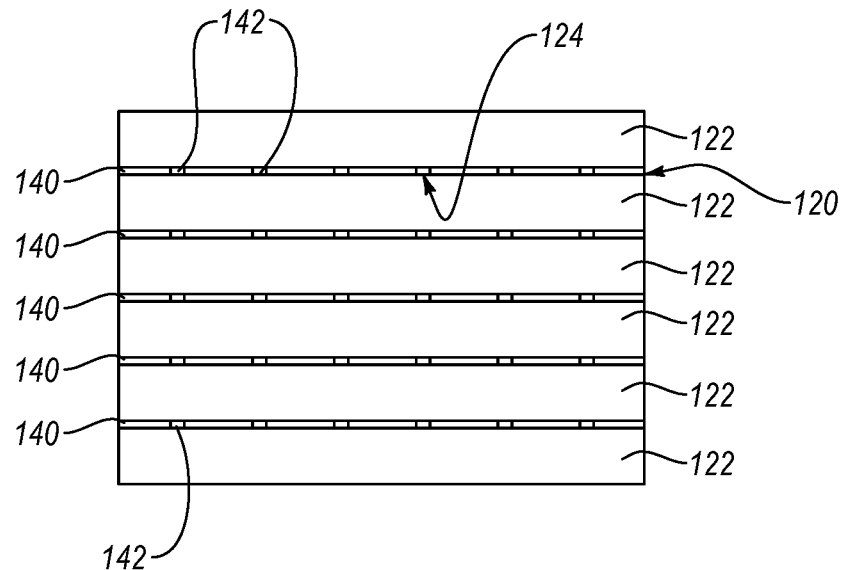
FIG. 7 is a side elevation view of a stack of sheets of fusible material and sheets of metallic material, according to one or more examples of the present disclosure.
Figure 12:
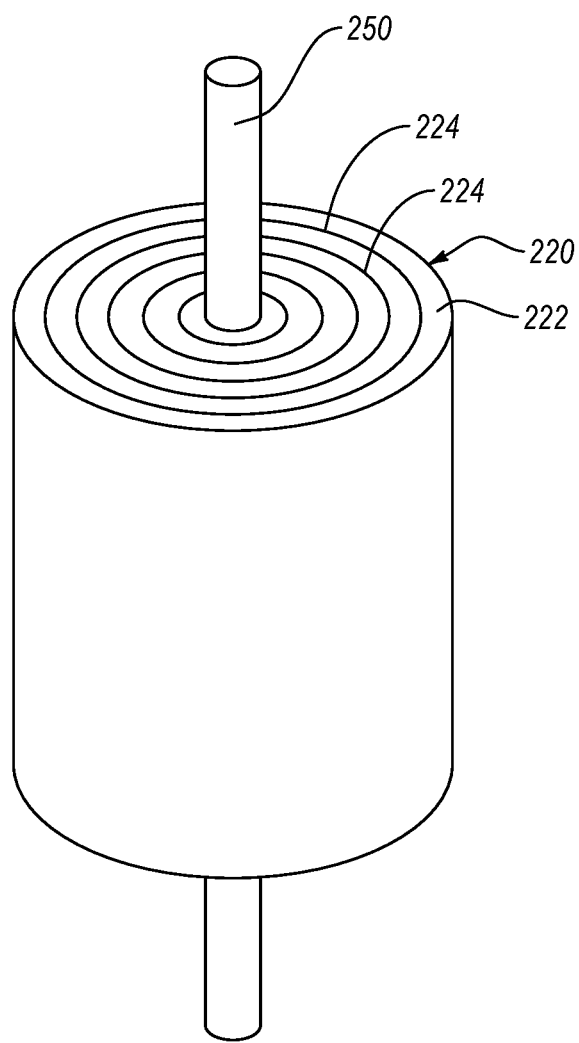
FIG. 12 is a perspective view of a rolled stack of sheets of fusible material, according to one or more examples of the present disclosure.
Figure 13:
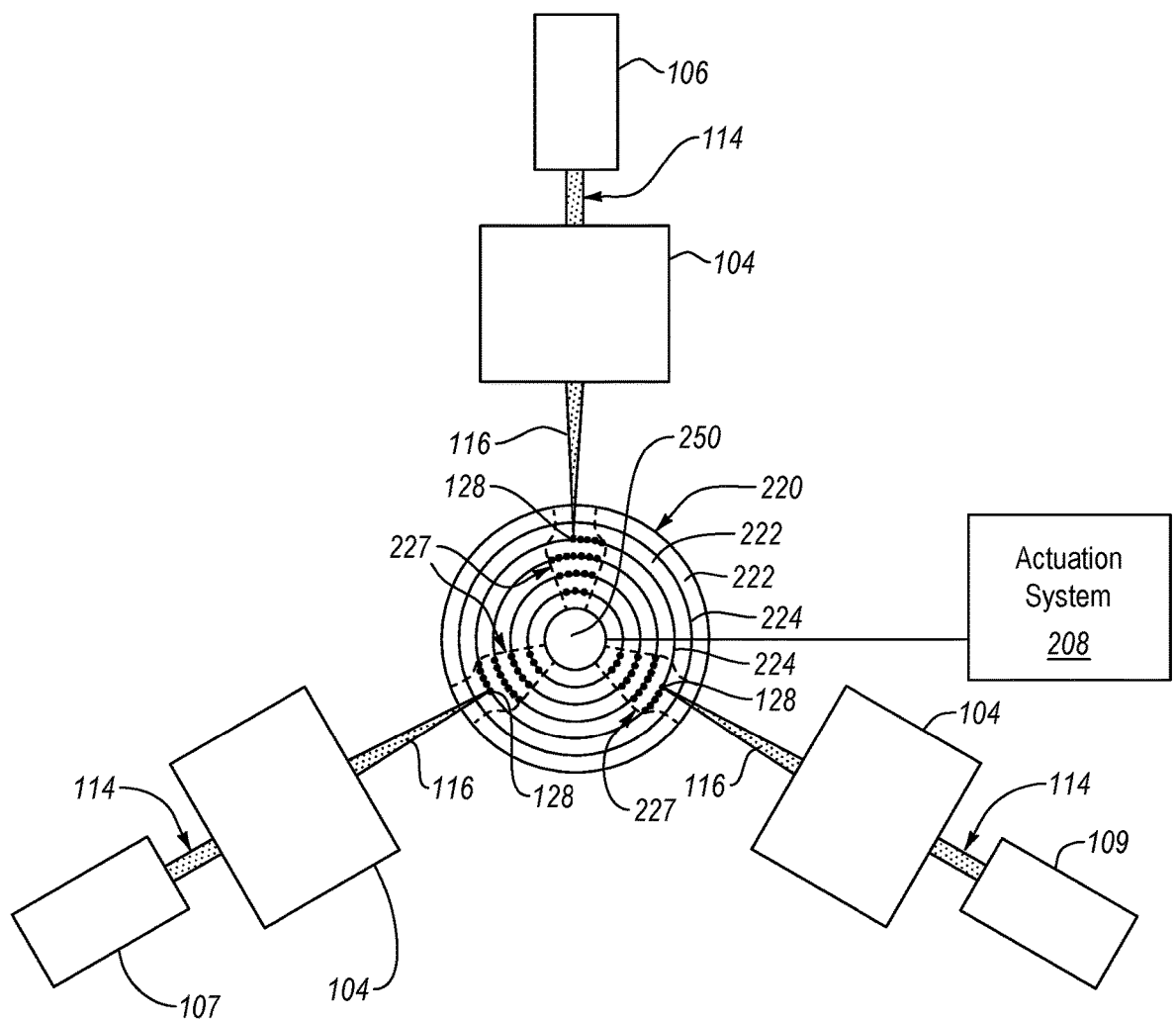
FIG. 13 is a schematic top plan view of a portion of a system for fabricating parts from the rolled stack of sheets of FIG. 12, according to one or more examples of the present disclosure.

The stack 120 is defined as two or more sheets 122 of fusible material aligned one on top of another in a stacked or overlapping formation. Referring to FIG. 3, according to one example, each of the sheets 122 of the stack 120 is thin and flat. More specifically, each sheet 122 has two broad surfaces 123 that are opposite and parallel to each other. In the illustrated embodiment, the broad surfaces 123 are planar and spaced apart from each other by a thickness t of the sheet 122. However, in other embodiments, such as shown in FIGS. 12 and 13, the broad surfaces 123 of the sheets 122 are non-planar or curved. The thickness t of each sheet 122 is smaller than a length L and width W of the sheet. Furthermore, in certain implementations, the stack 120 has a height H equal to a combined thickness of the sheets 122, a length L equal to the length L of the sheets 122, and a width equal to the width W of the sheets 122. An interface 124 is defined as the space between or the intersection between the broad surfaces 123 of adjacent sheets. For example, in the implementation shown in FIGS. 1 and 3, when stacked on top of each other, the interface 124 is defined where the broad surfaces 123 of adjacent sheets 122, being planar, are flush against each other. However, in other implementations, such as shown in FIG. 7, the interface 124 between adjacent sheets 122 also includes the space or gap between the broad surfaces 123 of the adjacent sheets 122.

As presented above, each sheet 122 is made of a fusible material. As defined herein, a fusible material is a rigid material that becomes pliable or moldable above a specific temperature and solidifies upon cooling. Additionally, a fusible material can blend with another fusible material to form a homogenous joining of the fusible materials in response to both fusible materials receiving sufficient energy to melt the fusible materials. In one implementation, the fusible material is a thermoplastic material that is optically transparent (to desired wavelengths of a laser) and may include optically non-reflective organic dyes. In one embodiment, the energy sufficient to melt the fusible material of the sheets 122 is less than that to melt metal. For example, the fusible material of the sheets 122 is a thermoplastic material, such as acrylic, polyamides, polycarbonates, polyethylene, polypropylene, polystyrene, and the like, in some implementations. According to certain implementations, the fusible material of the sheets 122 is optically transparent (e.g., clear) to desired radiation wavelengths. In yet some implementations, the sheets 122 include dyes integrated with the fusible material, which can make the sheets 122 optically non-transparent, semi-transparent, or opaque.

With a stack 120 in place on the base 110, the focused portion 116 of the first laser beam 114 is focused at multiple locations on an interface 124 between adjacent sheets 122 of the stack 120. Generally, the focused portion 116 is focused on the interfaces 124 between adjacent sheets 122 of the stack 120, one interface at a time starting with the interface 124 closest to the base 110 or furthest away from the optics 104. In order to focus the focused portion 116 on a given interface 124 between adjacent sheets 122, the focused portion 116 passes through at least one of the sheets 122 of the stack 120, including the sheet 122, of the adjacent sheets 122 defining the given interface 124, that is closest to the optics 104. In some implementations, the focused portion 116 passes through least one additional sheet 122 of the stack 120 before passing through the sheet 122, of the adjacent sheets 122 defining the given interface 124, that is closest to the optics 104. For example, as represented in FIG. 1, the focused portion 116 passes through two additional sheets 122 of the stack 120 before passing through the sheet 122, of the adjacent sheets 122 defining the given interface 124, that is closest to the optics 104. Accordingly, the focused portion 116 can pass through any number of sheets 122 before focusing in on a location on an interface 124 between adjacent sheets 122 of the stack 120.

Generally, the controller 102 controls the first formation laser 106 and the actuation system 108 to direct the focused portion 116 of first laser beam 114 at multiple locations between adjacent sheets 122 of the stack 120. The multiple locations are selected according to a predetermined pattern corresponding with a design of a part. The design of the part is also predetermined, such as by using computer-aided drafting (CAD) software. For example, the CAD software may be capable of converting a model of the part, generated using the CAD software, into code (e.g., computerized numerical control (CNC) code) representing the predetermined pattern, which is readable by the controller 102.

In response to executing the code, and through electronic commands, the controller 102 sets the characteristics of the first laser beam 114 generated by the first formation laser 106, activates the first formation laser 106 to generate the first laser beam 114 according to the set characteristics, actuates the optics 104, via the actuation system 108, to focus the focused portion 116 of the first laser beam 114 at multiple locations between sheets 122 of the stack 120, and moves the stack 120 relative to the optics 104, via the actuation system 108, to form multiple molten regions 128 at each of the multiple locations according to the predetermined pattern. A molten region 128 is formed by melting discrete portions of adjacent sheets 122 with energy from the first laser beam 114 such that the melted portions homogenously meld or fuse together. Generally, as energy from the first laser beam 114 melts the fusible material within a focus diameter of the focused portion 116, the damaged or melted portion of the fusible material spreads from within the focus diameter to outside of the focus diameter. The amount of fusible material melted outside of the focus diameter is largely dependent on the threshold fluence of the first laser beam 114 at which melting of the fusible material occurs, which threshold fluence can be different for different fusible materials.

The molten regions 128 along a given interface 124 between adjacent sheets 122 are sized and spaced to conjoin together with each other. Accordingly, the molten regions 128 along a given interface 124 effectively and homogenously fuse together the adjacent sheets 122 defining the given interface 124. The portions of the adjacent sheets 122 fused together via the molten regions 128 define a fused portion 127 of the adjacent sheets 122. In contrast, the portions of the adjacent sheets 122 not fused together define an unfused portion 129 of the adjacent sheets 122. In some implementations, the fused portion 127 includes only two adjacent sheets 122 and thus molten regions 128 along only one interface 124. However, in other implementations, such as shown in FIG. 1, the fused portion 127 includes more than two adjacent sheets 122 and thus molten regions 128 along multiple interfaces 124. A boundary 126 is defined between the fused portion 127 and the unfused portion 129. The boundary 126 defines an outer peripheral shape of a part (e.g., the part 130 (see FIG. 2)).

Figure 4:
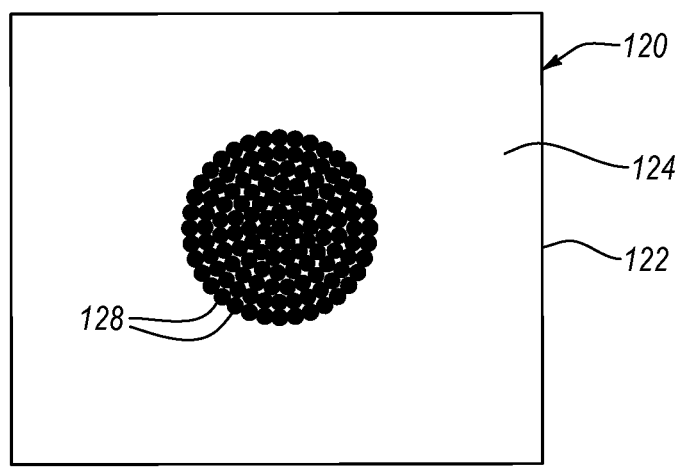
FIG. 4 is a top plan view of multiple molten regions on an interface between adjacent sheets of a stack of sheets, taken along the line 4-4 of FIG. 1, according to one or more examples of the present disclosure.

For parts made of a fused portion 127 with more than two sheets 122 and multiple interfaces 124, the controller 102 controls the first formation laser 106 and the actuation system 108 to form the molten regions 128 one interface 124 (or plane) at a time in some implementations. For example, the controller 102 controls the optics 104 to focus the focused portion 116 of the first laser beam 114 at multiple locations along a first one of the interfaces 124. The controller 102 controls the actuation system 108 to laterally move the stack 120, relative to the focused portion 116, parallel to the first one of the interfaces 124 while stopping at each one of the multiple locations. At each location, the energy of the focused portion 116 of the first laser beam 114 at the first one of the interfaces 124 and the amount of time the first one of the interfaces 124 is exposed to the focused portion 116 is sufficient to melt and meld together small portions of the sheets 122 defining the first one of the interfaces to form a molten region 128. Once a molten region 128 is formed at one location, the controller 102 moves the focused portion 116 to an adjacent location to form another molten region 128. This process continues until all the molten regions 128, defined by the predetermined pattern, are formed along the first one of the interfaces 124 to form a section of the fused portion 127 and thus a section of the part 130. FIG. 4 shows a pattern of molten regions 128, corresponding to the predetermined pattern, formed in the same plane along an interface between adjacent sheets 122 of the stack 120. In one implementation, the predetermined pattern of molten regions 128 can be created using a rastering technique (e.g., following a rastering path). The pattern of molten regions 128 in FIG. 4 has a substantially circular shape, thus forming a section of the fused portion 127 or the part 130 with a substantially circular cross-sectional shape. Although the pattern of molten regions 128 in FIG. 4 has a substantially circular shape, the pattern of molten regions 128 can be any of various symmetrical, non-symmetrical, solid, and hollow shapes.

After all the molten regions 128, defined by the predetermined pattern, are formed along the first one of the interfaces 124, the controller 102 controls the actuation system 108 to vertically move the stack 120 relative to the focused portion 116 of the first laser beam 114 and/or controls the optics 104 to focus the focused portion 116 of the first laser beam 114 at multiple locations along a second one of the interfaces 124. In other words, in one implementation, the focused portion 116 of the first laser beam 114 is vertically shifted to the next interface 124 in the stack 120. A process of forming molten regions 128, defined by the predetermined pattern, along the second one of the interfaces 124 to form another section of the fused portion 127 and thus a another section of the part 130 is controlled by the controller 102. The pattern of molten regions 128 formed along the second one of the interfaces 124 can be the same as (e.g., same size and shape as) or different than (e.g., different size and/or shape as) the pattern of molten regions 128 formed along the first one of the interfaces 124.

More generally, in one embodiment, the focused portion 116 is focused at multiple locations on a first interface between a first sheet of the sheets 122 of the stack 120 and a second sheet of the sheets 122 of the stack 120 and the focused portion 116 is focused at multiple locations on a second interface between the second sheet of the sheets 122 of the stack 120 and a third sheet of the sheets 122 of the stack, where the second sheet is interposed between the first sheet and the third sheet. As presented in more detail below, after the focused portion 116 is focused at the multiple locations on the first interface between the first sheet of the sheets 122 of the stack 120 and the second sheet of the sheets 122 of the stack 120 and before the focused portion 116 is focused at the multiple locations on the second interface between the second sheet of the sheets 122 of the stack 120 and the third sheet of the sheets 122 of the stack 120, the third sheet is automatically (e.g., autonomously) feed onto the second sheet of the sheets 122 of the stack 120 using an actuator.

The above-presented process continues until molten regions 128 are formed along all interfaces 124 of adjacent sheets 122 of the stack 120, according to the predetermined pattern, to form a complete fused portion 127 corresponding with the design of the part 130. Accordingly, the complete fused portion 127 includes a preset number of sheets 122 of fusible material fused together along respective interfaces. In some implementations, all of the present number of sheets 122 of fusible material are formed into the stack 120 on the base 110 prior to fusing together any of the sheets 122. However, as shown in FIG. 1, according to an illustrated embodiment, one or more sheets 122 are added to the stack 120 after at least two of the sheets 122 of the stack 120 on the base 110 are fused together. For example, the controller 102 controls a feed mechanism of the actuation system 108 to feed one or more sheets 122 onto the stack 120 after at least two of the sheets 122 of the stack 120 are fused together according to the above process. The sheets 122 can be fed onto the stack 120 one at a time, two at a time, or three or more at a time. Generally, the controller 102 is operable to automatically feed a sheet 122 or sheets 122 onto the stack 120 after two adjacent sheets 122 on the stack 120 are fused together according to the predetermined pattern. A sheet 122 added onto the stack 120 is ultimately fused to an adjacent one of the sheets 122 of the stack 120 to effectively add to the fused portion 127 of the stack 120. Sheets 122 are added to the stack 120 and fused to adjacent sheets 122 of the stack 120 in this additive manner until the fused portion 127 is completed.

Referring to FIG. 2, according to one embodiment, after the fused portion 127 of the stack 120 is completed, the controller 102 controls the first separation laser 112 to generate the second laser beam 160 and controls the actuation system 108 to direct the second laser beam 160 into the stack 120 along the boundary 126. The second laser beam 160 is configured to score (e.g., cut through) the sheets 122 of the stack 120 along the boundary 126 between the fused portion 127 and the unfused portion 129 of the stack 120. Scoring the stack 120 along the boundary 126 separates the unfused portion 129 from the fused portion 127, which allows the unfused portion 129 to be removed from the fused portion 127. With the unfused portion 129 removed from the fused portion 127, the fused portion 127 becomes or defines the part 130.

The part 130 can have any of various shapes. Moreover, the shape of the part 130 can be a two-dimensional shape (e.g., consisting of two sheets 122), a simple three-dimensional shape (e.g., comprising multiple sheets 122 where the patterns of the molten regions 128 between adjacent sheets 122 are simple similar shapes), or a three-dimensional compound shape (e.g., comprising at least one molten region 128 with a pattern having a compound shape (e.g., combination of simple shapes) or multiple sheets 122 where the patterns of molten regions 128 are dissimilar shapes). As defined herein, a three-dimensional compound shape is a shape with a combination of at least two simple shapes.

The second laser beam 160 provides an accurate and precise scoring of the stack 120 along the boundary 126. Moreover, due to the homogenous composition of the sheets 122 of the stack 120 and the precision of the second laser beam 160, the exterior finish of the part 130 is smoother than conventional additive manufacturing techniques that use powder or wire-fed materials.

The actuation system 108 includes any of various actuators for controlling movement of the first separation laser 112 and the direction of the second laser beam 160. For example, a robotic arm may be used to three-dimensionally control the orientation of the first separation laser 112. In yet some implementations, the stack 120 is scored along the boundary 126 using any of various other scoring mechanisms, such as blades, saws, hot wire, chemicals, and the like.

In some embodiments, each sheet 122 of the stack 120 has the same thickness t. However, referring to FIG. 4, according to one embodiment, the sheets 122 of a stack 120 may have different thicknesses. For example, some sheets 122 of the stack 120 of FIG. 4 have a first thickness t1 and other sheets 122 of the stack 120 of FIG. 4 have a second thickness t2. The first thickness t1 is less than the second thickness t2. Varying the thickness of the stack 120 helps to improve manufacturing efficiency. For example, a part design where some sections have a contoured outer surface and other sections have outer surfaces that are less contoured, the stack 120 is ordered such that the sheets 122 defining the more contoured outer surface are thicker than the sheets 122 defining the less contoured outer surface.

Figure 8:
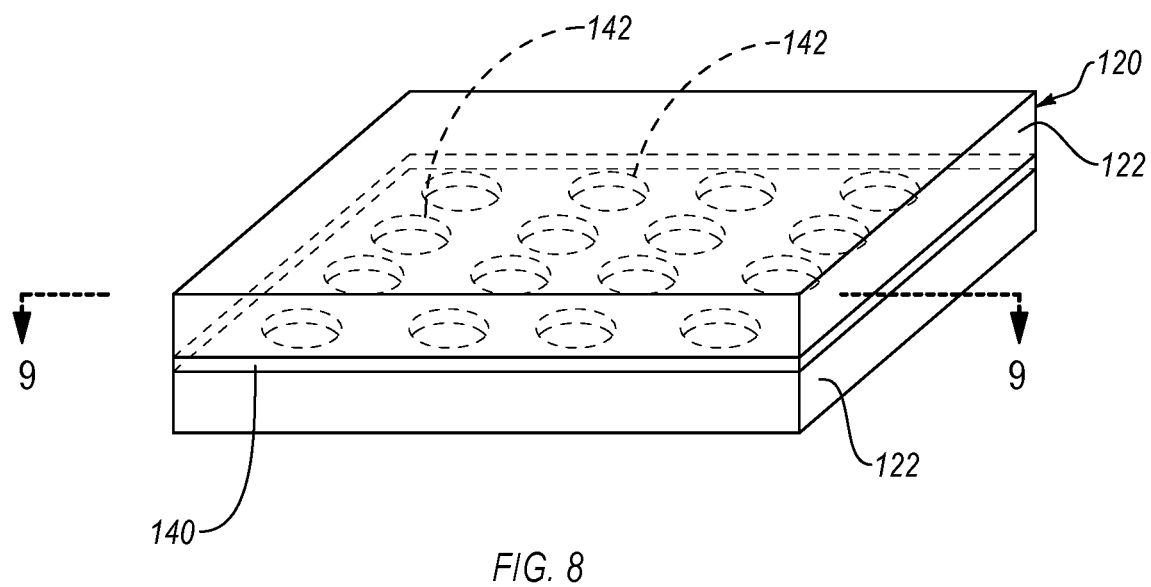
FIG. 8 is a perspective view of a stack of sheets of fusible material and a sheet of metallic material, according to one or more examples of the present disclosure.

Referring to FIGS. 7 and 8, in some embodiments, the stack 120 includes at least one sheet 140, of non-fusible material, between adjacent sheets 122 of the stack 120. As shown in FIG. 7, the stack 120 includes one sheet 140 between adjacent sheets 122 such that the sheets of the stack 120 alternate between sheets 122 and sheets 140. Accordingly, the interface 124 between adjacent sheets 122 includes a space or gap between the adjacent sheets 122. The non-fusible material of the sheets 140 can be any of various metals, such as silver, copper, aluminum, nickel, steel, and the like, with a melting temperature significantly higher than the fusible material of the sheets 122. In some implementations, the sheets 140 are made of a non-metallic material, such as polymers, ceramics, and the like, that has a melting temperature significantly higher than the fusible material of the sheets 122.

Each sheet 140 includes apertures 142 positioned on the sheet 140 at locations that correspond with desired locations of the multiple molten regions 128. In some implementations, the size of the apertures 142 may vary based on the wavelength of the first laser beam 114 and the melting properties of the fusible material of the sheets 122. The distribution pattern of the apertures 142 varies based on the desired shape of the part 130. In one particular example where the fusible material is a polymer, such as PET, polyimide, PEEK, etc., the wavelength of the first laser beam 114 is about 10 microns and the diameter of each aperture 142 is about 0.2 mm.

Figure 9:
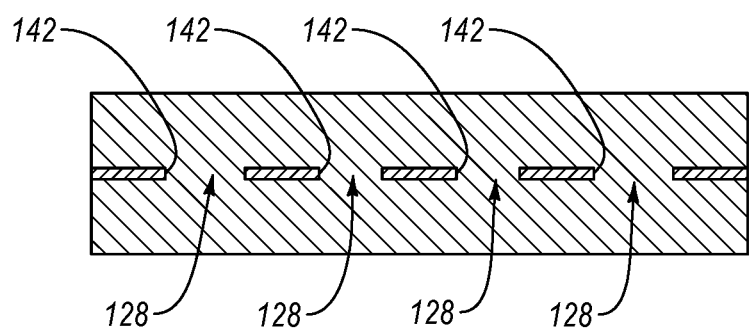
FIG. 9 is a cross-sectional side elevation view of a fused portion of a stack of sheets of fusible material and a sheet of metallic material, according to one or more examples of the present disclosure.

The controller 102 is configured to control the focused portion 116 of the first laser beam 114 such that the focused portion 116 focuses on locations of the interface 124 aligned with the apertures 142. In this manner, as shown in FIG. 9, a molten region 128 conjoining adjacent sheets 122, at the interface 124 between the adjacent sheets 122, can be formed within a respective one of the apertures 142 of the sheet 140. In other words, adjacent sheets 122 are joined or fused together, at molten regions 128, through the apertures 142 to form the fused portion 127 of the stack 120. The sheets 140 of the fused portion 127 of the stack 120, and ultimately the part 130, may help to promote strength of the part 130 and/or enhanced thermal conductivity along the interface between adjacent sheets 122. Also, the sheets 140 may be used as electrical communication conduits. In an additive manufacturing process, the feed mechanism of the actuation system 108 can be controlled by the controller 102 to automatically feed sheets 140, as well as sheets 122, onto the stack 120. The sheets 122 and sheets 140 can be fed separately from one another, such as one sheet 140 being fed onto the stack 120 at one time and one sheet 140 fed onto that sheet 140 at a later time. Alternatively a mini-stack of one sheet 122 and one sheet 140 can be added together onto the stack 120.

To promote bonding between adjacent sheets 122 of the stack 120, the system 100 includes an alternate energy source 170 in some implementations. The alternate energy source 170 is configured to generate energy 172 and supply the energy 172 to the stack 120 while the focused portion 116 of the first laser beam 114 forms the molten regions 128 in the stack 120. In one implementation, the alternative energy source 170 is a heater and the energy 172 is thermal energy. The thermal energy helps to create a temperature gradient in the stack 120, which can be utilized to promote fusing of adjacent sheets 122 by the focused portion 116 of the first laser beam 114. According to another implementation, the alternative energy source 170 is a wave transmitter and the energy 172 is ultrasonic energy. The ultrasonic energy helps introduces molecular-level undulations or waviness in the adjacent sheets 122 at the interface 124 between the adjacent sheets 122. The waviness promotes molecular level interlocking between the fusible material of the adjacent sheets 122, which improves fusion between the adjacent sheets 122.

Figure 10:
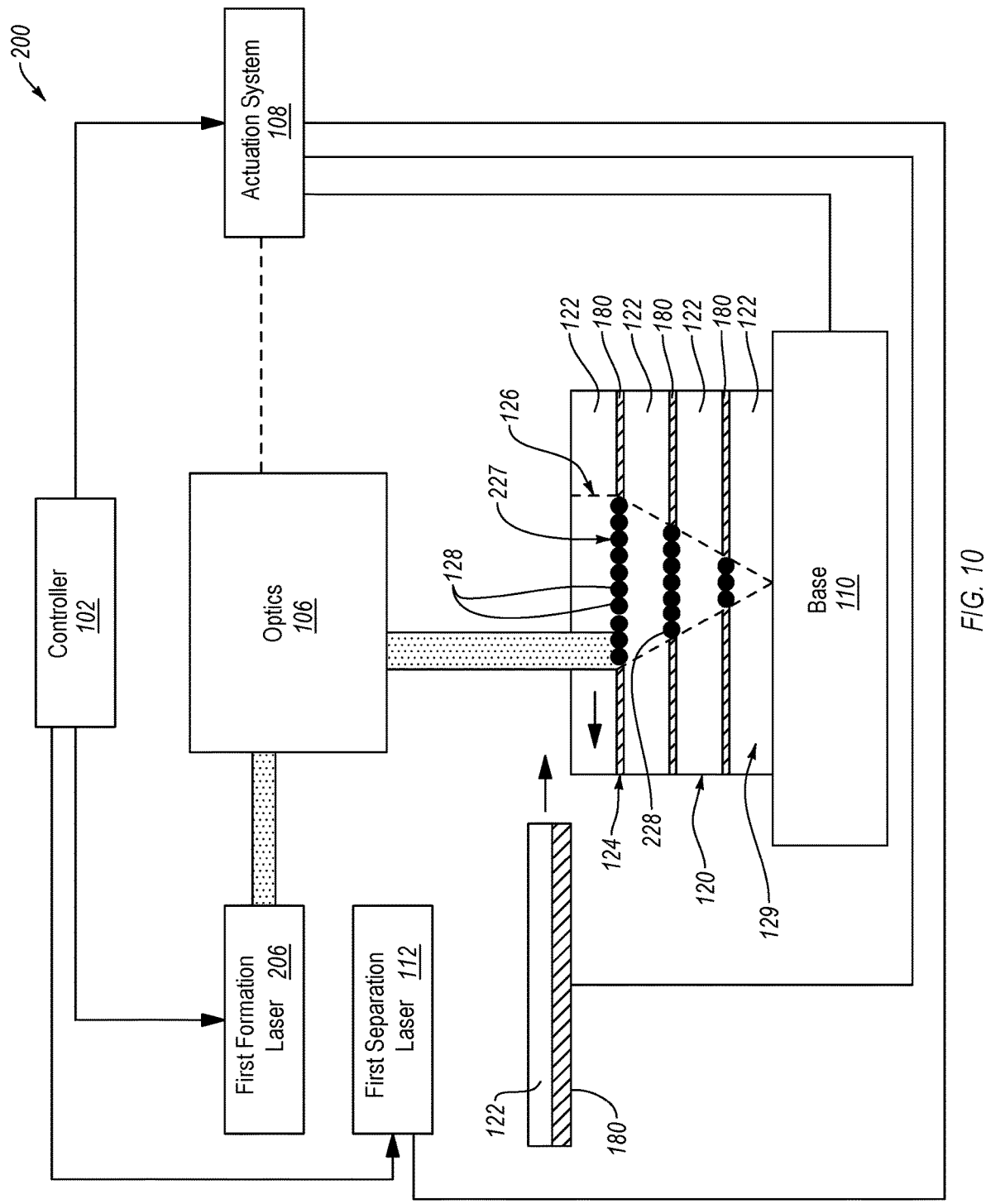
FIG. 10 is a schematic diagram of a system for fabricating a part, with the system executing a fused portion formation step of a method of fabricating a part, according to one or more examples of the present disclosure.

Referring to FIG. 10, according to another embodiment, a system 200 for fabricating a part includes a controller 102, optics 204, a first formation laser 206, an actuation system 108, and a base 110. The controller 102 is operably coupled with the optics 204, the first formation laser 206, and the actuation system 108. Generally, the system 200 is similar to the system 100 of FIG. 1, with like numbers referring to like features. Accordingly, unless otherwise indicated, the description of the features of the system 100 previously presented apply to the like features of the system 200.

Like the system 100, the system 200 utilizes the energy from a first laser beam 214 to melt and fuse together adjacent sheets 122 of a stack 120 of sheets 122 to form a part in an additive manufacturing manner. However, instead of focusing (e.g., converging) the first laser beam 214 at a particular location along an interface between adjacent sheets 122 to melt the adjacent sheets 122, as with the system 100, the system 200 utilizes the laser-energy absorption capability of sheets 180 of semi-transparent fusible material between adjacent sheets 122 to facilitate the fusing together of the adjacent sheets 122. Accordingly, the first laser beam 214 does not need to be focused, but rather merely need to be directed into the sheets 180, whether as a focused or non-focused beam.

The stack 120 includes sheets 122 of transparent fusible material. The stack 120 further includes at least one sheets 180 of semi-transparent fusible material interposed between adjacent sheets 122 of the stack 120. According to one implementation, the stack 120 includes an alternating arrangement of the sheets 122 and the sheets 180. The semi-transparent fusible material of the sheets 180 includes a fusible material infused (e.g., embedded) with a non-transparent dye. The first laser beam 214 passes through the sheets 122, but the dye is configured to absorb the energy of the first laser beam 214, thus preventing passage of the first laser beam 214 through the sheets 180. For example, the first formation laser 216 can be configured to produce a two-photon laser beam (relatively faster pulses (e.g., femto-second pulses) and longer wavelengths (e.g., lower energy)), in addition to or alternatively from a one-photon laser beam (relatively slower pulses and shorter wavelengths (e.g., higher energy)). Accordingly, in one implementation, the dye of the sheets 180 is configured to absorb the energy from two photons of the two-photon laser beam simultaneously and allow pass-through of, or not absorb, the energy from a one-photon laser beam. In some implementations, the dye of the sheets 180 is one or more of, for example, porphyrines, phthalocyanines, bis(styryl)benzene, pi-conjugated chromphores, dendrimetic molecules, and the like (including derivatives). According to the two-photon absorption phenomenon, absorption of energy from two-photons simultaneously promote more focused fusion of fusible materials at targeted locations deep within the fusible materials where the laser beam is focused compared to single-photon absorption phenomenon. Therefore, the dye of the sheets 180 can be selected and the first laser beam 214 can be tuned such that the dye experiences two-photon-absorption.

Generally, the controller 102 controls the first formation laser 206 and the actuation system 108 to direct the first laser beam 214 at multiple locations of a sheet 180 interposed between adjacent sheets 122 of the stack 120. The multiple locations are selected according to a predetermined pattern corresponding with a design of a part. In response to executing code, and through electronic commands, the controller 102 sets the characteristics of the first laser beam 214 generated by the first formation laser 206 (e.g., two-photon mode), activates the first formation laser 206 to generate the first laser beam 214 according to the set characteristics, and moves the stack 120 relative to the optics 204, via the actuation system 108, to form multiple molten regions 228 at each of the multiple locations according to the predetermined pattern. Because the first laser beam 214 need not be focused for its energy to be absorbed in the stack 120 shown in FIG. 10, the optics 204 may be configured differently than the optics 104 of the system 100. For example, the optics 204 may not have a converging lens. Moreover, because the photons from a two-photon laser beam 214 can have a wavelength twice that of a single-photon laser beam, less energy is required to effectuate fusion between adjacent sheets 122 compared to using a single-photon laser beam. Also, when the first formation laser 106 is configured to generate a two-photon laser beam in pulse mode, the pulse width that effectuates fusion between adjacent sheets 122 can be relatively lower compared to single-photon laser beams, such as less than a nanosecond in some implementations and less than a femto-second in other implementations.

A molten region 228 is formed by melting discrete portions of a sheet 180, via energy absorbed from the first laser beam 214, which results in corresponding discrete portions of the adjacent sheets 122 to melt. The melted portions of the sheet 180 and the adjacent sheets 122 meld or fuse together to form a molten region 228. The molten regions 228 along a sheet 180 at a given interface 124 between adjacent sheets 122 are sized and spaced to conjoin together with each other. Accordingly, the molten regions 228 along a given interface 124 effectively fuse together the adjacent sheets 122, defining the given interface 124, via the sheet 180 between the adjacent sheets 122. The portions of the adjacent sheets 122 fused together via the molten regions 228 define the fused portion 127 of the adjacent sheets 122.

Although the system 100 and the system 200 have been described as fabricating one part, it is recognized that in some embodiments, the system 100 and the system 200 can include multiple formation lasers controlled to produce multiple parts from the same stack 120 at the same time.

Referring to FIG. 10, according to an illustrated embodiment, one or more sheets 122 and one or more sheets 180 are added to the stack 120 after at least two of the sheets 122 of the stack 120, and at least one sheet 180, on the base 110 are fused together. For example, the controller 102 controls a feed mechanism of the actuation system 108 to feed one sheet 122 and one sheet 180 onto the stack 120 after at least two of the sheets 122 and at least one sheet 180 of the stack 120 are fused together according to the above process. The sheets 122 and the sheets 180 can be fed onto the stack 120 one at a time, two at a time, or three or more at a time.

Figure 11:
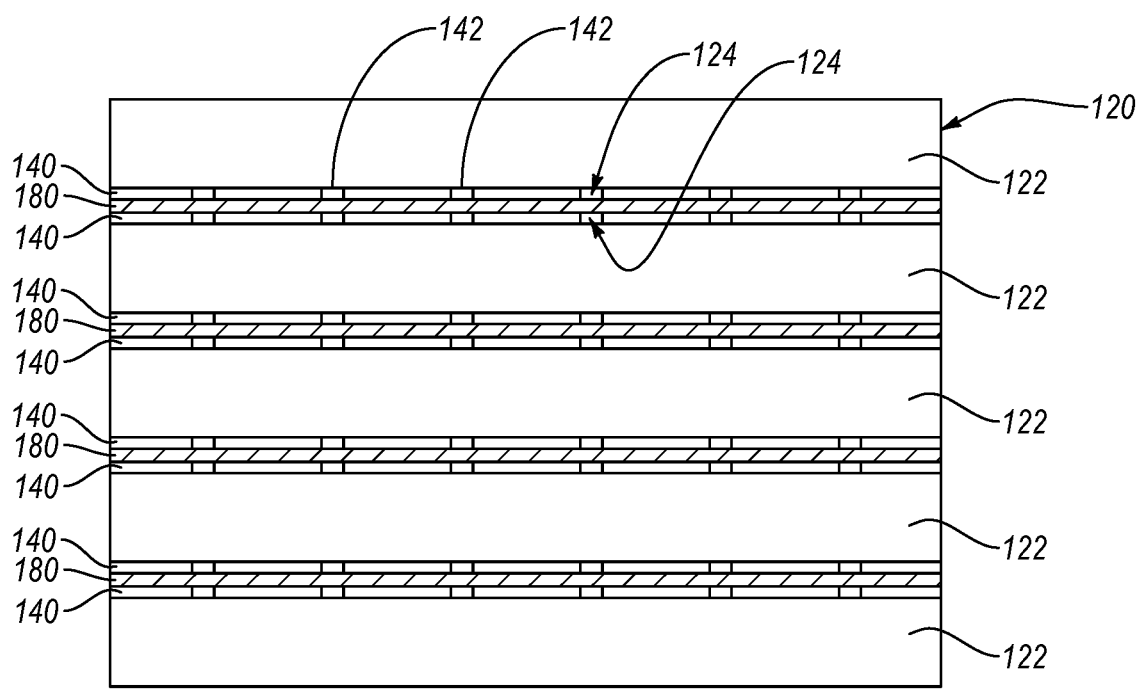
FIG. 11 is a side elevation view of a stack of sheets of fusible material and sheets of metallic material, according to one or more examples of the present disclosure.

As shown in FIG. 11, and similar to the stack 120 shown in FIGS. 7 and 8, in some embodiments, each sheet 180 of the stack 120 of FIG. 10 is sandwiched between at least two sheets 140. Each sheet 140 is made of a material and includes apertures 142 as presented above. In embodiments with such a stack 120, the controller 102 is configured to control the first laser beam 214 to be directed at the next closest sheet 180 at locations aligned with the apertures 142 of the sheets 140 sandwiching the next closest sheet 180. In this manner, a molten region conjoining adjacent sheets 122 and the sheet 180, at the interface 124 between the adjacent sheets 122, can be formed within respective apertures 142 of the sheets 140. In other words, adjacent sheets 122 and the sheet 180 between the adjacent sheets 122 are joined or fused together, at molten regions 128, through the apertures 142 of the sheets 140 to form the fused portion 127 of the stack 120.

Figure 14:
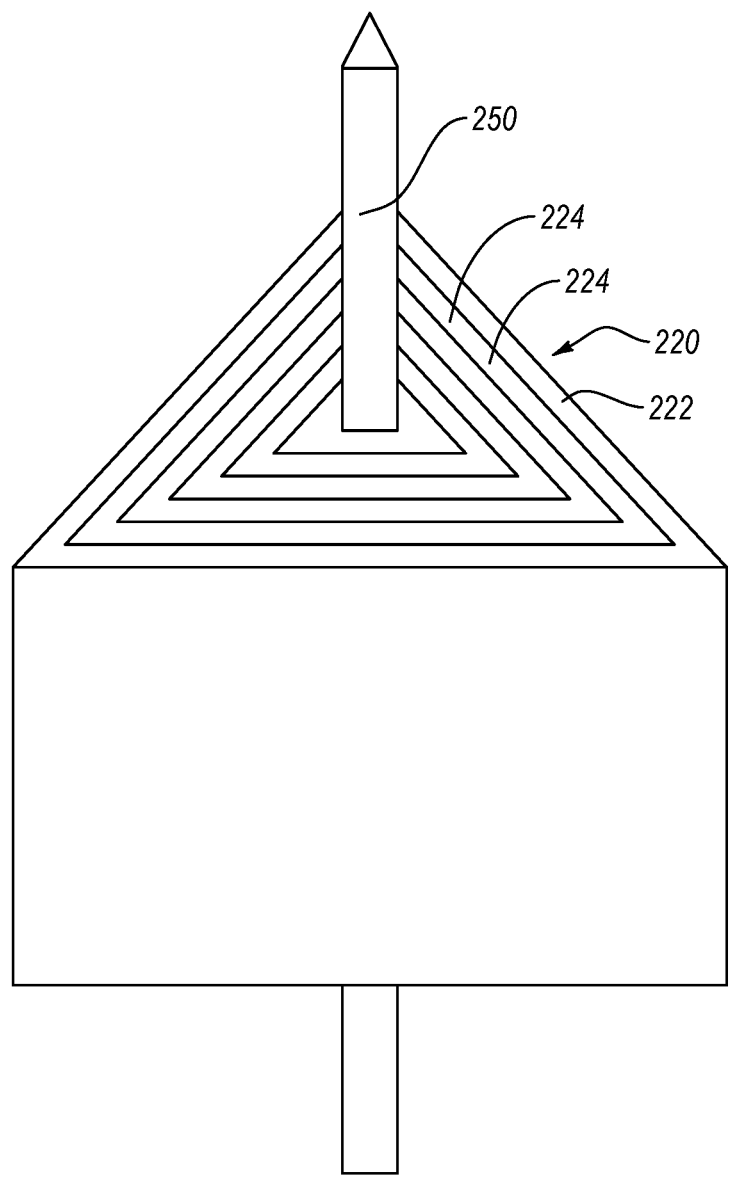
FIG. 14 is a perspective view of a rolled stack of sheets of fusible material, according to one or more examples of the present disclosure.

The stack 120 of sheets of fusible material has been shown and described as multiple planar sheets stacked on top of each other in a given direction (e.g., vertical). However, in some embodiments, a stack of sheets of fusible material can be a multiple-layered roll of fusible material. For example, referring to FIGS. 12-14, according to certain embodiments, a stack 220 can include a continuous sheet 222 of fusible material wrapped around itself to form a roll. The stack 220 may be formed about a central core 250, which provides a support structure with which to handle and/or manipulate the orientation of the stack 220. The continuous sheet 222 is initially wrapped about the central core 250 and then further wrapped about itself to define multiple layers of the stack 220. Each layer of the stack 220 functions like one of the sheets 122 of the stack 120 because the layers are effectively stacked on top of each other in a direction radially away from the central core 250. In fact, although not shown, a continuous sheet of non-fusible material and/or a continuous sheet of dyed material can be combined with the continuous sheet 222 and wrapped around the central core 250 to produce one or more layers of non-fusible material and/or dyed material between adjacent layers of the continuous sheet 222 to effectively replicate the function of the stacks 120 shown in FIGS. 7, 10, and 11.

The stack 220 can have any of various cross-sectional shapes, such as circular (e.g., FIG. 12), triangular (e.g., FIG. 14), rectangular, square, polygonal, and the like. The central core 250 may have the same cross-sectional shape as the stack 220, which promotes the formation of the cross-sectional shape of the stack 220 as the continuous sheet 222 is wrapped around the central core 250.

Although the stack 220 has been described as a continuous sheet 222 wrapped around itself, in some embodiments, the stack 220 may include multiple separate sheets wrapped around the central core 250 and other sheets, but not wrapped around itself. For example, for a stack 220 that is circularly shaped, as in FIG. 12, each sheet would be circularly shaped with opposing ends adjacent each other to form a ring such that adjacent sheets would comprise adjacent rings.

Figure 15:
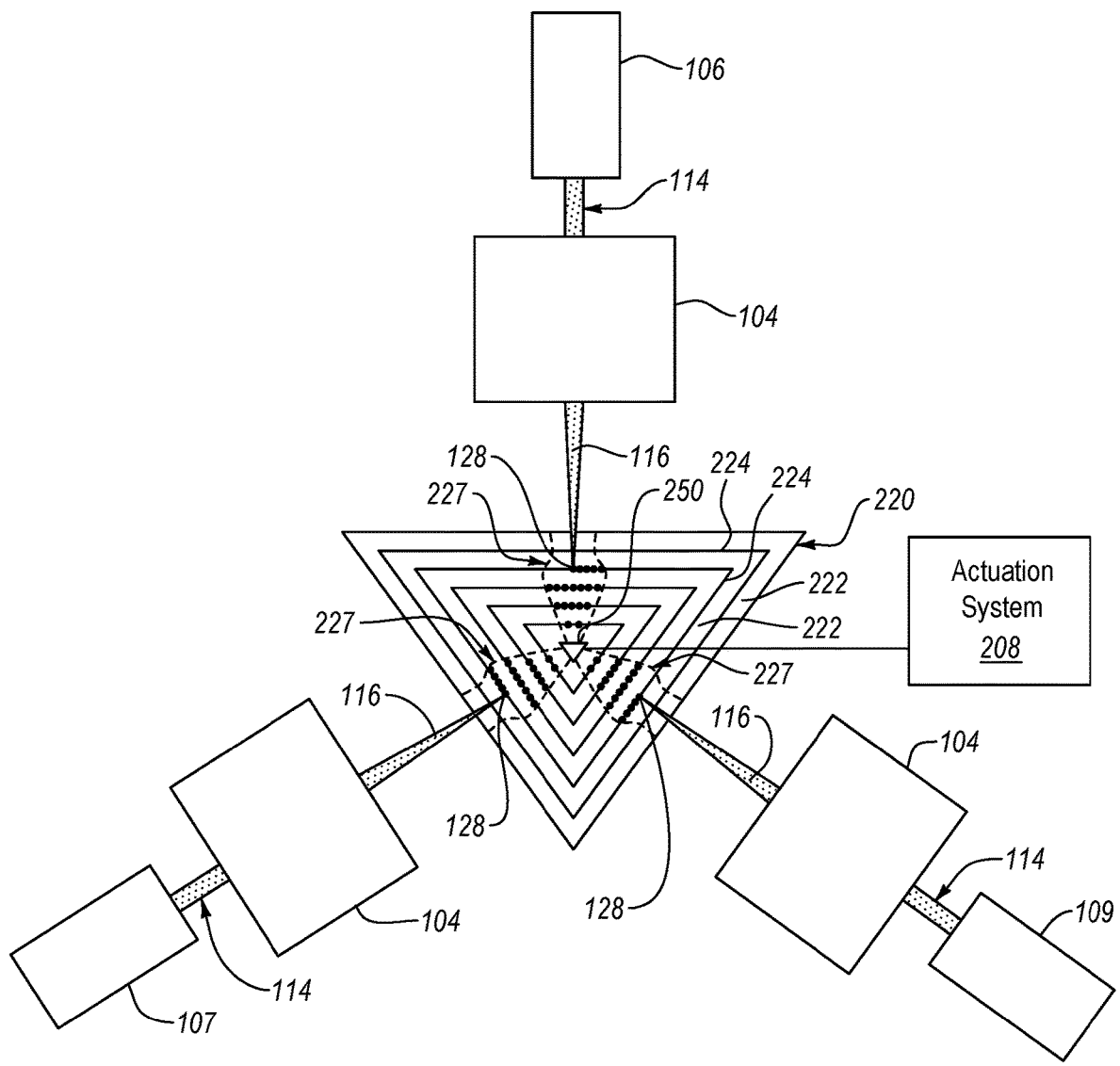
FIG. 15 is a schematic top plan view of a portion of a system for fabricating parts from the rolled stack of sheets of FIG. 14, according to one or more examples of the present disclosure.

Instead of a base 110, the position and/or orientation of the central core 250 can be adjusted by any of various actuators, such as a robotic arm, of an actuation system 208 (see, e.g., FIGS. 13 and 15). Accordingly, the position and/or orientation of the stack 220 can be adjusted by adjusting the central core 250 using the actuation system 208. The stack 220, forming a roll about the central core 250, is conducive to forming multiple parts at one time with multiple formation lasers. For example, as shown in FIGS. 13 and 15, the first formation laser 106 generates the first laser beam 114, which is focused into a focused portion 116 by the optics 104 to form one fused portion 227 in the stack 220 on one side of the stack 220. Additionally, a second formation laser 107 generates another first laser beam 114, which is focused into a focused portion 116 by the separate optics 104 to form another fused portion 227 in the stack 220 on another side of the stack 220. Further, a third formation laser 109 generates yet another first laser beam 114, which is focused into a focused portion 116 by the separate optics 104 to form yet another fused portion 227 in the stack 220 on yet another side of the stack 220. Accordingly, in the embodiments shown in FIGS. 13 and 15, three separate parts are being formed in different sides of the same stack 220 by three separate formation lasers and optics. It is recognized that one, two, or more than three parts can be formed in the same stack 220 in a similar manner. It is also recognized, in some implementations, the relative movement of the stack 220 and the at least one focused portion 116 of the laser beams necessary to form a part in the stack 220 can be enhanced with the stack 220 because the stack 220 can be more easily manipulated along more than two dimensions than the stack 120.

Figure 16:
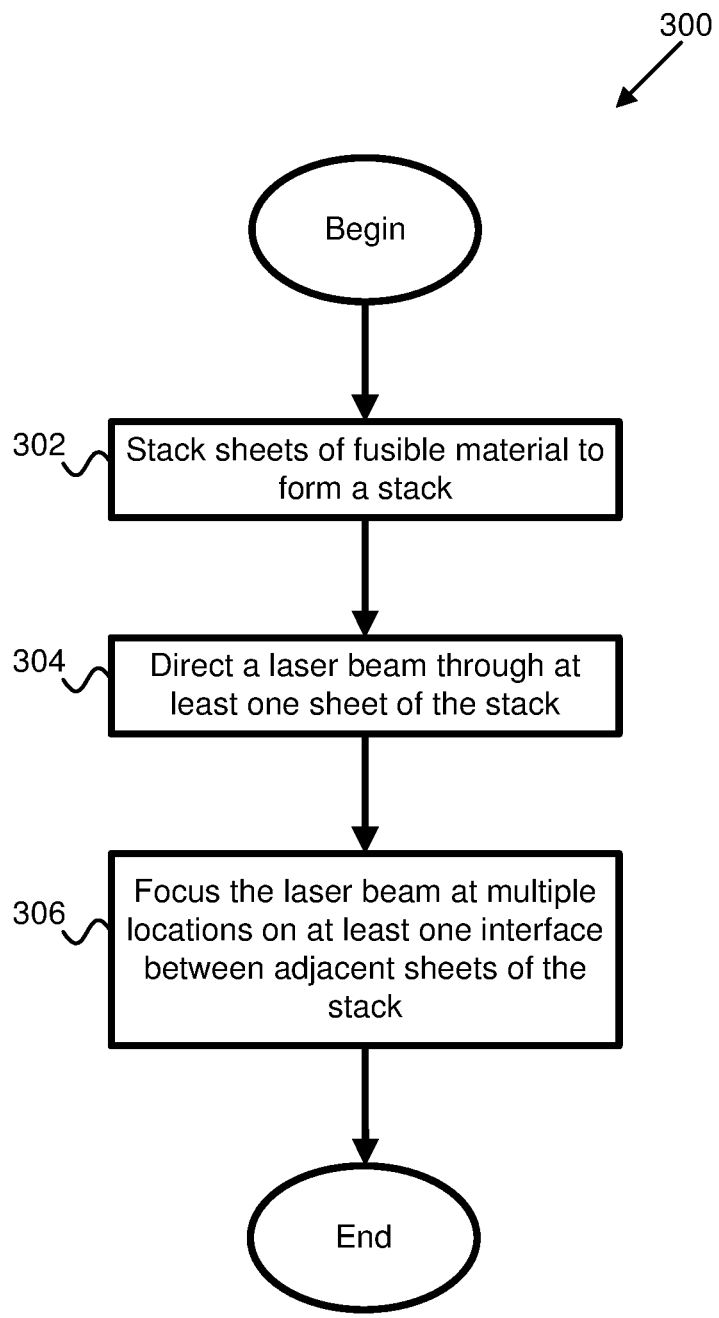
FIG. 16 is a schematic flow chart of a method of fabricating a part, according to one or more examples of the present disclosure.

Referring to FIG. 16, one embodiment of a method 300 of fabricating a part is shown. The steps of the method 300 can be executed by the system 100 described herein according to one implementation. The method 300 includes stacking sheets of fusible material to form a stack at 302. The method 300 additionally includes directing a laser beam through at least one sheet of the stack at 304. The method 300 further includes focusing the laser beam at multiple locations on at least one interface between adjacent sheets of the stack at 306. The laser beam can be focused at multiple locations, according to a predetermined pattern corresponding with a design of the part, to form corresponding multiple molten regions, conjoined together to form a fused portion of the adjacent sheets. The fused portion of the adjacent sheets defines the part.

Figure 17:
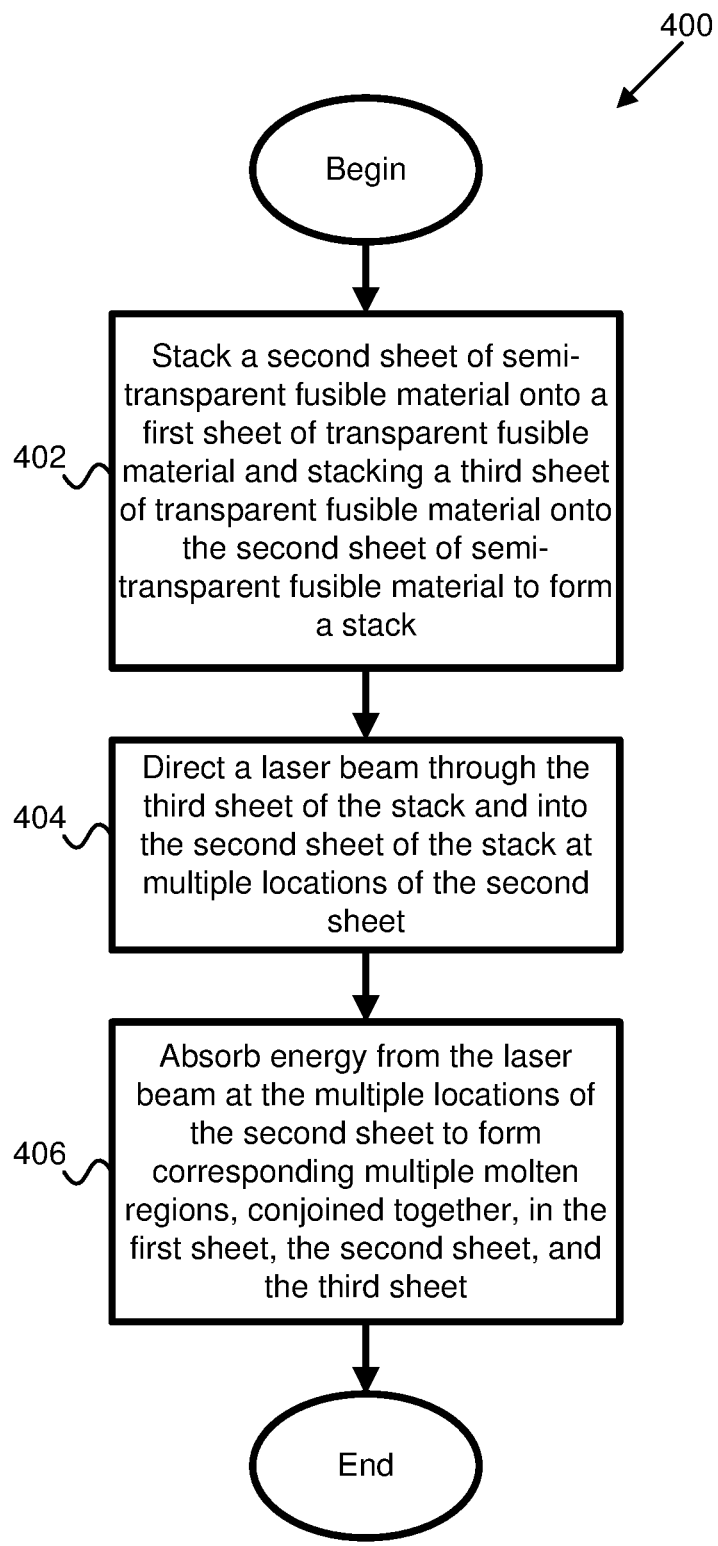
FIG. 17 is a schematic flow chart of a method of fabricating a part, according to one or more examples of the present disclosure.

Referring to FIG. 17, another embodiment of a method 400 of fabricating a part is shown. The steps of the method 400 can be executed by the system 200 described herein according to one implementation. The method 400 includes stacking a second sheet of semi-transparent fusible material onto a first sheet of transparent fusible material and stacking a third sheet of transparent fusible material onto the second sheet of semi-transparent fusible material at 402 to form a stack. The first sheet, second sheet, and third sheet are stacked such that the second sheet is interposed between the first sheet and the third sheet, to form the stack. The method 400 also includes directing a laser beam through the third sheet of the stack and into the second sheet of the stack at multiple locations of the second sheet at 404. The method 400 further includes absorbing energy from the laser beam at the multiple locations of the second sheet to form corresponding multiple molten regions, conjoined together, in the first sheet, the second sheet, and the third sheet at 406, which forms a fused portion of the first sheet, the second sheet, and the third sheet. The fused portion of the first sheet, the second sheet, and the third sheet defines the part.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of fabricating a part, the method comprising steps of:

forming a stack from at least two sheets of fusible material, the at least two sheets comprising a bottom sheet that comprises a bottom-sheet top surface, a bottom-sheet bottom surface, and a bottom-sheet thickness, separating the bottom-sheet top surface and the bottom-sheet bottom surface, and a top sheet that comprises a top-sheet top surface, a top-sheet bottom surface, and a top-sheet thickness, separating the top-sheet top surface and the top-sheet bottom surface, wherein the bottom sheet and the top sheet are stacked such that the top-sheet bottom surface and the bottom-sheet top surface form an interface between the top sheet and the bottom sheet;

directing a laser beam through the top-sheet top surface and through the top-sheet thickness such that the laser beam passes through the top-sheet top surface and through the top-sheet thickness without transferring energy to any portion of the top sheet so that no portion of the top sheet is melted; and transferring the energy from the laser beam, directed through the top-sheet top surface and the top-sheet thickness, to multiple spaced-apart regions of the interface between the top sheet and the bottom sheet such that only a portion of the top-sheet thickness, abutting the multiple spaced-apart regions of the interface between the top sheet and the bottom sheet, and only a portion of the bottom-sheet thickness, abutting the multiple spaced-apart regions of the interface between the top sheet and the bottom sheet, are melted;

wherein melted portions of the top sheet of the stack and the bottom sheet of the stack define a fused portion of the of the stack and the fused portion of the stack defines at least a portion of the part.

2. The method according to claim 1, further comprising:

selectively scoring adjacent sheets of the stack at a boundary between the fused portion of the stack and at least one unfused portion of the stack based on a preexisting computer-aided drafting model of the part; and removing the at least one unfused portion of the stack from the fused portion of the stack.

3. The method according to claim 1, wherein the fused portion of the stack is homogenous and forms a one-piece monolithic construction.

4. The method according to claim 1, wherein the fusible material comprises a thermoplastic material.

5. The method according to claim 4, wherein the thermoplastic material is optically transparent for at least one radiation wavelength.

6. The method according to claim 1, wherein the step of transferring the energy from the laser beam to the multiple spaced-apart regions of the interface comprises a step of focusing the laser beam at the multiple spaced-apart regions.

7. The method according to claim 6, wherein:
the at least two sheets further comprise a second top sheet that comprises a second-top-sheet top surface, a second-top-sheet bottom surface, and a second-top-sheet thickness, separating the second-top-sheet top surface and the second-top-sheet bottom surface, wherein the top sheet and the second top sheet are stacked such that the second-top-sheet bottom surface and the top-sheet top surface are in contact with each other and form a second interface between the second top sheet and the top sheet;
the method further comprises a step of directing the laser beam through the second-top-sheet top surface and through the second-top-sheet thickness such that the laser beam passes through the second-top-sheet top surface and through the second-top-sheet thickness without transferring the energy to any portion of the second top sheet so that no portion of the second top sheet is melted;
the method further comprises a step of transferring the energy from the laser beam, directed through the second-top-sheet top surface and the second-top-sheet thickness, to multiple second spaced-apart regions of the second interface between the second top sheet and the top sheet such that only a portion of the second-top-sheet thickness, abutting the multiple second spaced-apart regions of the second interface between the second top sheet and the top sheet, and only a portion of the top-sheet thickness, abutting the multiple second spaced-apart regions of the interface between the second top sheet and the top sheet, are melted; and
melted portions of the second top sheet of the stack and the top sheet of the stack further define the fused portion of the of the stack.

8. The method according to claim 7, wherein the step of forming the stack comprises, after the laser beam is directed through the top-sheet top surface and through the top-sheet thickness and the energy from the laser beam is transferred to the multiple spaced-apart regions of the interface between the top sheet and the bottom sheet, comprises automatically feeding the second top sheet onto the top sheet using an actuator.

9. The method according to claim 7, wherein:
the multiple spaced-apart regions of the interface are arranged in a first configuration;
the multiple second spaced-apart regions of the second interface are arranged in a second configuration; and
the first configuration is different than the second configuration.

10. The method according to claim 6, wherein the step of focusing the laser beam at the multiple spaced-apart regions comprises at least one of moving the stack relative to the laser beam or adjusting a focus of the laser beam.

11. The method according to claim 1, further comprising supplying a second energy to the stack concurrently with directing the laser beam through the top-sheet top surface and through the top-sheet thickness and with transferring the energy from the laser beam to the multiple spaced-apart regions of the interface.

12. The method according to claim 11, wherein the second energy comprises at least one of thermal energy or ultrasonic energy.

13. The method according to claim 1, further comprising positioning a sheet of metallic material between the bottom sheet and the top sheet, wherein:
the sheet of metallic material defines a portion of the interface between the top sheet and the bottom sheet; and
the sheet of metallic material comprises apertures each defining a respective one of the multiple spaced-apart regions of the interface between the top sheet and the bottom sheet.

14. The method according to claim 1, wherein one of:
the bottom sheet is thicker than the top sheet; or
the top sheet is thicker than the bottom sheet.

15. The method according to claim 1, wherein the fused portion has a three-dimensional compound shape.

16. The method according to claim 1, further comprising, while directing the laser beam through the top-sheet top surface and through the top-sheet thickness and transferring the energy from the laser beam to the multiple spaced-apart regions of the interface between the top sheet and the bottom sheet:
directing a second laser beam through the top-sheet top surface; and
through the top-sheet thickness such that the second laser beam passes through the top-sheet top surface and through the top-sheet thickness without transferring the energy to any portion of the top sheet so that no portion of the top sheet is melted; and
transferring the energy from the second laser beam, directed through the top-sheet top surface and the top-sheet thickness, to multiple second spaced-apart regions of the interface between the top sheet and the bottom sheet such that only a portion of the top-sheet thickness, abutting the multiple second spaced-apart regions of the interface between the top sheet and the bottom sheet, and only a portion of the bottom-sheet thickness, abutting the multiple second spaced-apart regions of the interface between the top sheet and the bottom sheet, are melted;
wherein melted portions of the top sheet of the stack and the bottom sheet of the stack, melted by the energy from the second laser beam, define a second fused portion of the stack and the second fused portion of the stack defines at least a portion of a second part that is different from the part.

17. The method according to claim 16, wherein the step of forming the stack comprises wrapping a continuous sheet of the fusible material about itself and a central core.

18. The method according to claim 17, wherein the laser beam and the second laser beam are directed through the top-sheet top surface and through the top-sheet thickness in different directions that are transverse to a central axis of the central core.

19. The method of claim 1, wherein:
the at least two sheets further comprise a second top sheet that comprises a second-top-sheet top surface, a second-top-sheet bottom surface, and a second-top-sheet thickness, separating the second-top-sheet top surface and the second-top-sheet bottom surface, wherein the top sheet and the second top sheet are stacked such that the second-top-sheet bottom surface and the top-sheet top surface are in contact with each other and form a second interface between the second top sheet and the top sheet; and the step of directing the laser beam through the top-sheet top surface and through the top-sheet thickness further comprises directing the laser beam through the second-top-sheet top surface and through the second-top-sheet thickness such that the laser beam passes through the second-top-sheet top surface and through the second top-sheet thickness without transferring the energy to any portion of the second top sheet so that no portion of the second top sheet is melted.

20. The method of claim 1, further comprising positioning a middle sheet between the bottom sheet and the top sheet, wherein:
    the middle sheet defines a portion of the interface between the top sheet and the bottom sheet;
    the middle sheet comprises a dye configured to absorb two photons of a first laser beam energy pulsed at a first rate and not absorb single photons of a second laser beam energy pulsed at a second rate;
    the first rate is higher than the second rate;
    the first laser beam energy is lower than the second laser beam energy; and
    the laser beam is pulsed at the first rate and has photons of the first laser beam energy, such that the energy from the laser beam is absorbed by the middle sheet, after being directed through the top-sheet top surface and through the top-sheet thickness, and transferred from the middle sheet to the bottom sheet and the top sheet to melt only the portion of the top-sheet thickness, abutting the multiple spaced-apart regions of the interface between the top sheet and the bottom sheet, and melt only the portion of the bottom-sheet thickness, abutting the multiple spaced-apart regions of the interface between the top sheet and the bottom sheet.

21. The method according to claim 2, wherein:
    the laser beam is generated by a formation laser; and
    the adjacent sheets of the stack are scored at the boundary between the fused portion of the stack and the at least one unfused portion of the stack by a second laser beam generated by a separation laser that is different than the formation laser.

22. The method according to claim 2, wherein:
    the laser beam is generated by a formation laser; and
    the adjacent sheets of the stack are scored at the boundary between the fused portion of the stack and the at least one unfused portion of the stack by a second laser beam generated by the formation laser.

\* \* \* \* \*